(12) United States Patent  (10) Patent No.: US 8,706,616 B1
Flynn  (45) Date of Patent: Apr. 22, 2014

(54) SYSTEM AND METHOD TO PROFIT BY PURCHASING UNSECURED DEBT AND NEGOTIATING REDUCTION IN AMOUNT DUE

(76) Inventor: Kevin Flynn, Philadelphia, PA (US)

( * ) Notice: Subject to any disclaimer, the term of this patent is extended or adjusted under 35 U.S.C. 154(b) by 0 days.

(21) Appl. No.: 13/528,764

(22) Filed: Jun. 20, 2012

Related U.S. Application Data

(60) Provisional application No. 61/498,835, filed on Jun. 20, 2011.

(51) Int. Cl.
*G06Q 40/00* (2012.01)
(52) U.S. Cl.
USPC .................................. 705/38; 705/35; 705/37
(58) Field of Classification Search
USPC ...................... 705/37, 36 R, 35, 38
See application file for complete search history.

(56) References Cited

U.S. PATENT DOCUMENTS

| | | | |
|---|---|---|---|
| 5,446,653 | A | 8/1995 | Miller et al. |
| 7,774,214 | B1 | 8/2010 | Lefco et al. |
| 2003/0050795 | A1 | 3/2003 | Baldwin et al. |
| 2004/0249666 | A1 | 12/2004 | Napolitano et al. |
| 2006/0190300 | A1 | 8/2006 | Drucker |
| 2006/0190334 | A1 | 8/2006 | Smith |
| 2007/0208594 | A1 | 9/2007 | Yang et al. |
| 2010/0287093 | A1* | 11/2010 | He et al. ........................ 705/38 |
| 2010/0324924 | A1 | 12/2010 | Frederiksen |
| 2011/0010189 | A1 | 1/2011 | Dean |
| 2011/0035315 | A1* | 2/2011 | Langley ........................ 705/38 |
| 2011/0071860 | A1 | 3/2011 | Fontenot |

OTHER PUBLICATIONS

BloomsbergBusinessweek Magazine, "Fresh Pain for the Uninsured", http://www.businessweek.com/stories/2007-12-02/fresh-pain-for-the-uninsured, Dec. 2, 2007, accessed Nov. 14, 2013, 3 pages.
Microvu, "Itemized Claim Review", http://www.mvsavings.com/services/itemized-claim-review.htm, © 2009, accessed Nov. 14, 2013, 2 pages.
TriCap Technology Group, "ARxChange", http://arxchange.com/, © 2005, accessed Nov. 14, 2013, 2 pages.

* cited by examiner

*Primary Examiner* — James A Vezeris
(74) *Attorney, Agent, or Firm* — Baker & Hostetler LLP

(57) ABSTRACT

A purchase of debt system ("PODS") and process that allows a debtor and entity using the system to financially benefit by exploiting the errors, fraud and inefficiencies contained in debts, such as medical bills. Specifically, the type of debt associated with, for example, medical bills is debt liability that has no asset(s) associated with it. The debtor is benefited by assigning the debt and associated liability, at a reduced price, to a third party (the entity using the system). The entity using the system then obtains a financial benefit by settling the debt, with the creditor, for an amount less than that paid to it by the debtor.

34 Claims, 50 Drawing Sheets

FIG. 1A-1

STEP 1 of 7

I. Your Contact Information

Full Name: [        ]
Address: [        ]
City, State Zip: [        ]
Tel#: [        ]
Email: [        ]

II. Please input the requested information on the bill below:

Provider Name: [        ]  #100   [        ]  [        ]  [        ]
                                                        Provider Address  City, State, Zip  Tax ID Patient Name: [        ]

Date of Service: [        ]

Total Amount Owed: $[        ]   #120

How much of the total amount owed is for a Deductible: $[0        ]

How much of the total amount owed is for a Co-Insurance: $[0        ]

II. Upload Scanned Images of the Medical Bills:

Click here to locate the imaged/scanned file on your computer to upload:
[ Browse - File to Upload ]

[ Submit ] [ Reset ]

FIG. 1A-2

STEP 2 of 7

Please answer the following questions relating to the bill:

A. Prior Financial Agreements: Please check one of boxes below:

⊙ No, the Responsible Party has not entered into any financial agreements for the accounts described in Section II of this agreement.

○ Yes, the Responsible Party has entered into any financial agreements for the accounts described in Section II of this agreement. Please attach the agreement(s) or if it was an oral agreement(s), describe the agreement(s):

B. Prior Efforts To Satisfy The Bill(s): Please check one of boxes below:

○ No entity (lawyer, proxy, other) representing the Responsible Party has contacted the provider to try and resolve the bill(s) described in II..

○ Yes, the Responsiole Party had an entity (lawyer, proxy, other) try to resolve the bill(s) described in Section II of this Agreement. Please describe the efforts:

[Submit] [Reset]

FIG. 1A-3

STEP 3 of 7

C. Workers Compensation: Please check one of boxes below:

◯ No, none of the bill(s) listed in Section II are related to Workers Compensation insurance or a Workers Compensation claim.

◯ Yes, one or more of the bill(s) listed in Section II are related to Workers Compensation insurance or a Workers Compensation claim. Please list which bill(s) are part of a Workers Compensation claim:

D. Auto Accident: Please check one of boxes below:

◯ No, none of the bill(s) listed in Section II are related to an automobile accident.

◯ Yes, one or more of the bill(s) listed in Section II are related to an automobile accidentPlease list which bill(s) are related to an automobile accident:

Submit | Reset

FIG. 1A-4

STEP 4 of 7

E. Was the provider In-Network: Please check one of boxes below:

○ No.

○ Yes.

F. Did you have health insurance at the time the debt was incurred: Please check one of boxes below:

○ No.

○ Yes.

G. Was this an elective procedure: Please check one of boxes below:

○ No.

○ Yes.

H. Did a medical error occur at any time: Please check one of boxes below:

○ No.

○ Yes.

I. Was the provider a facility or a medical office: Please check one of boxes below:

○ No.

○ Yes.

Submit | Reset

FIG. 1A-5

STEP 5 of 7

J. Was the provider located in an urban area: Please check one of boxes below:

○ No.

○ Yes.

K. If you had health insurance, was the bill denied by the insurance company?

○ No.

○ Yes.

L. If you answered "yes" to the insurer denying the claim; did you complete the appeals process?

○ No.

○ Yes.

M. What is your approximate credit score?

Input credit score here: [          ]

[Submit] [Reset]

STEP 6 of 7

N. Provider Type (click one)?

○ Medical

○ Dental

○ Durable medical equipment

○ Alternative medicine

○ Pharmacy

O. Are you currently in bankruptcy proceedings?

○ No.

○ Yes.

P. Is the patient deceased?

○ No.

○ Yes.

FIG. 1A-7

STEP 7 of 7

III. Please answer the following questions relating to your financial status:

A. Lawsuit: Please check one of boxes below: ⟋ #124

○ No, I am not seeking indemnification and a defense in the event a lawsuit is initiated against me relating to the bills _____ listed in Section II above.

○ Yes, I am seeking indemnification and a defense in the event a lawsuit is initiated against me relating to the bills _____ listed in Section II above.

B. Credit Repair: Please check one of boxes below: ⟋ #126

○ No, I am not seeking to repair my credit rating relating to the bills listed in Section II above.

○ Yes, I am seeking to repair my credit rating relating to the bills listed in Section II above.

[Submit] [Reset]

FIG. 1B-1

STEP 1 of 7

I. Your Contact Information

| | |
|---:|---|
| Full Name: | |
| Address: | |
| City, State Zip: | |
| Tel#: | |
| Email: | |

II. Please input the requested information on the bill below:

| | | | | |
|---:|---|---|---|---|
| Provider Name: | | | | |
| | #100 | Provider Address | City, State, Zip | Tax ID |
| Patient Name: | | | | |
| Date of Service: | | | | |
| | | | #120 | |
| Total Amount Owed: $ | | | | |

How much of the total amount owed is for a Deductible: $0

How much of the total amount owed is for a Co-Insurance: $0

II. Upload Scanned Images of the Medical Bills:

Click here to locate the imaged/scanned file on your computer to upload:

[ Browse - File to Upload ]

[ Submit ] [ Reset ]

FIG. 1B-2

STEP 2 of 6

Please answer the following questions relating to the bill:

A. Prior Financial Agreements: Please check one of boxes below:

⊙ No, the Responsible Party has not entered into any financial agreements for the accounts described in Section II of this agreement.

○ Yes, the Responsible Party has entered into any financial agreements for the accounts described in Section II of this agreement. Please attach the agreement(s) or if it was an oral agreement(s), describe the agreement(s):

B. Prior Efforts To Satisfy The Bill(s): Please check one of boxes below:

○ No entity (lawyer, proxy, other) representing the Responsible Party has contacted the provider to try and resolve the bill(s) described in II..

○ Yes, the Responsible Party had an entity (lawyer, proxy, other) try to resolve the bill(s) described in Section II of this Agreement. Please describe the efforts:

[Submit] [Reset]

FIG. 1B-3

STEP 3 of 7

C. Workers Compensation: Please check one of boxes below:

○ No, none of the bill(s) listed in Section II are related to Workers Compensation insurance or a Workers Compensation claim.

○ Yes, one or more of the bill(s) listed in Section II are related to Workers Compensation insurance or a Workers Compensation claim. Please list which bill(s) are part of a Workers Compensation claim:

D. Auto Accident: Please check one of boxes below:

○ No, none of the bill(s) listed in Section II are related to an automobile accident.

○ Yes, one or more of the bill(s) listed in Section II are related to an automobile accidentPlease list which bill(s) are related to an automobile accident:

Submit  Reset

FIG. 1B-4

STEP 4 of 7

E. Was the provider In-Network: Please check one of boxes below:

○ No.

○ Yes.

F. Did you have health insurance at the time the debt was incurred: Please check one of boxes below:

○ No.

○ Yes. Estimated insurance payment: [ _____ ] ← #122

G. Was this an elective procedure: Please check one of boxes below:

○ No.

○ Yes.

H. Did a medical error occur at any time: Please check one of boxes below:

○ No.

○ Yes.

I. Was the provider a facility or a medical office: Please check one of boxes below:

○ No.

○ Yes.

[Submit] [Reset]

FIG. 1B-5

STEP 5 of 7

J. Was the provider located in an urban area: Please check one of boxes below:

○ No.

○ Yes.

K. If you had health insurance, was the bill denied by the insurance company?

○ No.

○ Yes.

L. If you answered "yes" to the insurer denying the claim; did you complete the appeals process?

○ No.

○ Yes.

M. What is your approximate credit score?

Input credit score here: [          ]

[Submit] [Reset]

FIG. 1B-6

STEP 6 of 7

N. Provider Type (click one)?

○ Medical

○ Dental

○ Durable medical equipment

○ Alternative medicine

○ Pharmacy

O. Are you currently in bankruptcy proceedings?

○ No.

○ Yes.

P. Is the patient deceased?

○ No.

○ Yes.

Submit   Reset

FIG. 1B-7

STEP 7 of 7

III. Please answer the following questions relating to your financial status:

A. Lawsuit: Please check one of boxes below: #124

○ No, I am not seeking indemnification and a defense in the event a lawsuit is initiated against me relating to the bills     listed in Section II above.

○ Yes, I am seeking indemnification and a defense in the event a lawsuit is initiated against me relating to the bills     listed in Section II above.

B. Credit Repair: Please check one of boxes below: #126

○ No, I am not seeking to repair my credit rating relating to the bills listed in Section II above.

○ Yes, I am seeking to repair my credit rating relating to the bills listed in Section II above.

[Submit] [Reset]

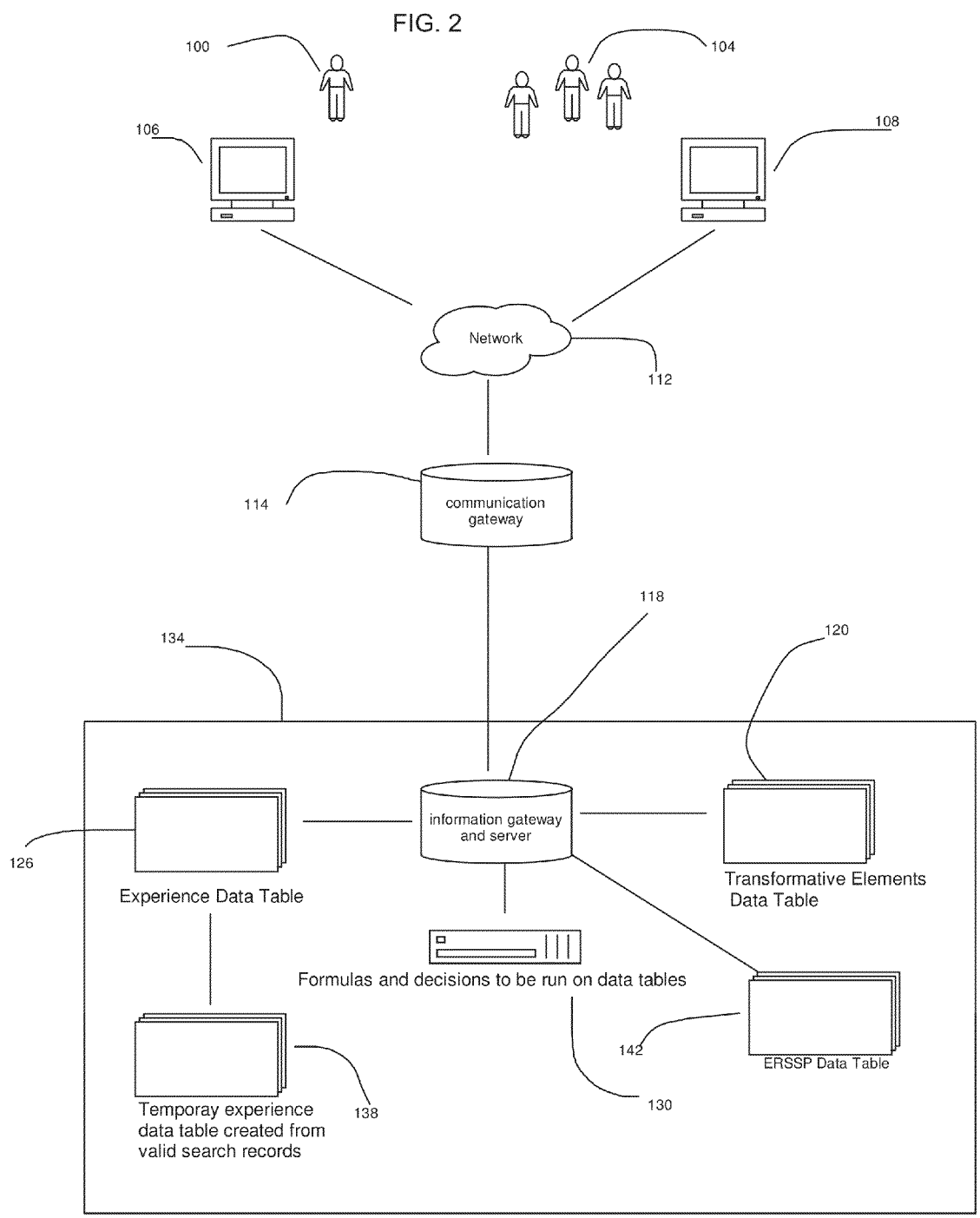

FIG # 3-1

ASSIGNEMNT OF DEBT LIABILITY

Date: [Variable: date field]

[Variable: Party's Name]
[Variable: Address]
[Variable: City, State Zipcode]

Re: Letter of Understanding

Dear [Variable: Party's Name]:

Please accept this as a letter of understanding between you (herein referred to as "Seller") and ABC Company, Inc (herein referred to as "HCA"). The basis of this understanding is that HCA will purchase the debt listed in Section 1 of this letter of understanding based on the following mutually agreed upon terms:

1. Cost and Transfer

120

Seller agrees to pay HCA the sum of $[variable field] for the medical bills outlined in the table below. HCA agrees to accept assignment for the financial responsibility for these accounts with the respective creditor(s) as outlined below:

[Variable: the table below is from the data inputted in Fig. 1]

| Provider Name (city/state) | Patient Name | Date of Service | Total Owed | Provider Acct# |
|---|---|---|---|---|
| [variable field] | [variable field] | [variable field] | [variable field] | [variable field] |

2. Definitions: Capitalized terms used in this Agreement shall have the meanings as ascribed to them herein.
- A "Seller" is the person who is responsible for the medical bill(s) and is the insurance beneficiary (i.e. the patient, child's guardian).
- The "Agreement" refers to this letter of understanding.
- The 'purchase of the debt' or 'purchase of your medical bill' as advertised, is in the form of a discounted payment/responsibility by Seller for the debt listed in Section 1.
- An "EOB" is an insurance company's or payer's explanation of benefits.
- Workers Compensation refers to a workers' compensation insurance plan(s).

3. Forty-Five Day Review: It is mutually agreed that HCA has forty-five days from the day the bill

FIG # 3-2

(s), financial agreements, medical records, full health plan description and EOBs are received by HCA to review the accuracy of the information supplied by Seller and to terminate this Agreement at HCA's discretion.

4.    Responsibilities of Seller: In addition to its obligations under this Agreement and any other agreements between the parties, Seller is responsible for:

A.    When a creditor or an agent (i.e. Collection company or law firm working on behalf of the provider) contacts Seller about the outstanding balance, Seller agrees to respond simply as follows, "please contact HealthCare Advocates, Inc as they are financially responsible for the bill."

B.    Within seven (7) days of the execution of this agreement, Seller will forward the latest insurance statements (a.k.a. explanation of benefits) that relate to the bills listed in Section 1.

C.    Seller will comply with all requests for information and additional materials by HCA. All questions and requests will be completed by Seller as quickly as possible. As a standard, it is reasonable to have questions answered within seven (7) days and requests for materials delivered within fourteen (14) days.

D. Seller agrees to forward copies of all bills, collection notices, legal notices and other to HCA within five (5) days of receipt by Seller until the bill(s) accepted by HCA (listed in Section 1) are settled.

E. There is a possibility that the bills accepted by HCA in Section 1 have or will be sent to a collections company or law firm. While HCA has assumed liability for the bills, HCA cannot guarantee that the bill(s) have not or will not be sent to a collections company, law firm, reported to a collection company; or other actions taken by the provider. HCA will provide a 'notice of liability' to the Seller so that the Seller may provide the 'notice of liability' to the collection company, credit reporting company, law firm or provider. Though HCA is liable for the bill(s) that it accepted, HCA cannot guarantee that the provider, collection company or law firm will leave you alone as HCA cannot control, and is not responsible for, the actions of the collections companies, credit reporting companies, law firm, provider or other third parties. Further, HCA is not a credit repair company and Seller must repair his/her own credit history.

F. Seller agrees to provide HCA with HIPAA consent forms when necessary thereby allowing HCA to obtain documents (i.e. medical records, invoices, etc) from the provider, insurer and/or third party that HCA determines necessary to satisfy the provider's claim/bill.

G. It is mutually agreed that Seller hereby assigns and transfers any and all insurance benefits for

FIG # 3-3 the bill(s) described in Section 1 to HCA and that any money paid by an insurance company or third party for the debt will be endorsed over to HCA and mailed to HCA. Seller further agrees to pay all legal expenses associated with collecting said funds if Seller fails to send payment from the insurer or third party.

H. If litigation is commenced in relation to the medical bills(s) listed in Section 1, Seller agrees to make reasonable efforts to assist HCA as needed during the lawsuit including but not limited to, providing documents, answering questions, participating in depositions and other things deemed necessary to support HCA's position during the litigation.

I. Seller will notify his/her insurance company of the total amount they paid for the medical care in the event the amount of the medical debt is applied to Seller's deductible or other.

5. Representations and Warranties of Seller:

A. The execution and delivery of this Agreement, and the performance by Seller of its obligations hereunder, have been duly authorized by all necessary parties on the part of Seller.

B. This Agreement has been duly executed and delivered by

Seller and is a legal, valid and binding obligation of Seller, enforceable against Seller in accordance with its terms.

C. Seller verifies that the bills being presented are accurate and that there are no additional charges, fees or other outstanding debts in connection with the bills listed in Section 1 of this Agreement.

D. All documents and work product are the property of HCA and considered confidential as they contain confidential/trade secret information.

E. The bills described in Section 1 of this Agreement are either not in collections or have been in collections for less than 60 days. Further, Seller certifies that there has been no threat of any legal action in an effort to collect on the outstanding bills described in Section 1.

F. HCA may share account data with the sales agent or third party broker for the purpose of reconciling any commissions or other financial issues. Private medical data will not be shared.

G. Insurance companies and other payers occasionally retract payment when they

FIG # 3-4 discover a payment was made in error. Seller agrees that any retracted payment(s) are not the responsibility of HCA and HCA is not liable for any loss or damages as a result of the retracted payment(s).

6. Indemnification:

A.    Seller Indemnification Obligations:

Seller shall indemnify and defend HCA, its representatives, officers, directors, employees, agents, successors and assignees (the "Seller INDEMNIFIED PARTIES") and hold the Seller INDEMNIFIED PARTIES harmless from and against any and all damages, based upon, attributable to, arising out of, or resulting from:

(i)    The breach by Seller of any provision of this Agreement.

(ii)    Promises, mis-representations and incorrect statements made by any third party, including sales agents or brokers, regarding HCA and this Agreement.

(iii) Though HCA has assumed the liability of the bills described in Section 1 of this Agreement, there is a chance that the bills may still be sent to a collection company or be placed as a black mark on the Seller's credit history in error. In such situations, Seller will not hold HCA responsible for the actions of the creditor(s) and Seller is responsible for contacting the credit agency to have the adverse credit mark removed from the Seller's credit report.

B.    HCA Indemnification Obligations:

HCA shall indemnify Seller (the "HCA INDEMNIFIED PARTIES") and hold the HCA INDEMNIFIED PARTIES harmless from and against any and all damages, including, without limitation, based upon, attributable to, arising out of, or resulting from the breach of any covenant or other agreement on the part of HCA under this Agreement.

(i) Promises, mis-representations and incorrect statements made by HCA to the Seller.

(ii) If legal action by the provider is initiated for non-payment of the bill(s) accepted by HCA (in Section 1) against Seller, HCA agrees to indemnity, defend and hold harmless ("assume the defense") Seller in the legal action. This clause is void if the legal action involves fraud, misrepresentation(s), a retracted payment by a payer, a breach of an agreement between the plaintiff and Seller, or other action that is not for the excusive reason of payment of the medical bill.

7. Confidential Information: FIG # 3-5

A. It is mutually agreed that this Agreement is confidential and will not be disclosed unless pursuant to a court order.

B. During the term of this Agreement, and at all times thereafter, each of the parties hereto agree: (i) not to, directly or indirectly, disclose, utilize or permit the unauthorized use or disclosure of any proprietary and/or confidential information, oral or written, with regard to its respective business, operations, methodologies, clients or other confidential information (collectively called the "CONFIDENTIAL INFORMATION"); and (ii) that each originating party's respective CONFIDENTIAL INFORMATION shall remain the sole property of such originating party. Notwithstanding the foregoing, this restriction shall not apply to information which an originating party releases to the general public or to third parties without restriction, or to information which is disclosed pursuant to judicial order or regulatory proceeding or to information that is published or becomes public knowledge through sources other than the parties listed in this Agreement. The confidentiality obligations of the parties hereof shall survive any termination of this Agreement. Further, it is agreed that all work product is confidential and property of HCA.

8. Termination: Should Seller breach any of the terms contained herein or make a material misrepresentation, HCA is entitled to return the medical bill(s) and Seller's money and terminate this Agreement.

9. Interpretation: The Parties hereto acknowledge and agree that (i) the rule of construction providing that any ambiguities are resolved against the drafting Party will not apply in interpreting the terms and provisions of this Agreement; and (ii) the terms and provisions of this Agreement will be construed fairly as to all Parties hereto and not in favor of or against a Party, regardless of which Party was generally responsible for the preparation of this Agreement.

10. Entire Agreement: This Agreement constitutes the entire Agreement between the parties hereto with respect to the subject matter hereof and supersedes all prior agreements, either written or oral, of the parties hereto concerning the subject matter hereof.

11. Venue & Governing Law: This Agreement shall be governed by, interpreted and construed in accordance with the laws of the Commonwealth of Pennsylvania. Venue is Philadelphia, PA.

12. Waiver and Amendment: No waiver or amendment of this Agreement shall be effective unless it is in writing and is signed by a duly authorized person of each respective party. The failure of either party to enforce any provision of this Agreement shall not constitute a waiver by either party of any provision. The past waiver of a provision by either party shall not constitute a course of conduct or pre-suppose a waiver in the future of that same provision.
By Clicking Submit You Are Agreeing to This Agreement:
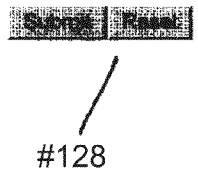
128
FIG # 3-6

FIG # 4-1

PRIMARY GUARANTOR AGREEMENT

Date: [Variable: date field]

[Variable: Party's Name]
[Variable: Address]
[Variable: City, State Zipcode]

Re: Letter of Understanding

Dear [Variable: Party's Name]:

Please accept this as a letter of understanding between you (herein referred to as "Seller") and [Name of Entity], Inc (herein referred to as "HCA"). The basis of this understanding is that HCA will guarantee the debt liability listed in Section 1 of this letter of understanding based on the following mutually agreed upon terms:

1. Cost and Guarantor Status   # 120

Seller agrees to pay HCA the sum of $[variable field] to be the primary guarantor for the medical bills outlined in the table below and it is mutually agreed that Seller's responsibility for the debt has been fulfilled with said payment.

[Variable: the table below is from the data inputted in Fig. 1]

| Provider Name (city/state) | Patient Name | Date of Service | Total Owed | Provider Acct# |
|---|---|---|---|---|
| [variable field] | [variable field] | [variable field] | [variable field] | [variable field] |

2. Definitions: Capitalized terms used in this Agreement shall have the meanings as ascribed to them herein.
- A "Seller" is the person who is responsible for the medical bill(s) and is the insurance beneficiary (i.e. the patient, child's guardian).
- The "Agreement" refers to this letter of understanding.
- The 'purchase of the debt' or 'purchase of your medical bill' as advertised, is in the form of a discounted payment/responsibility by Seller for the debt listed in Section 1.
- An "EOB" is an insurance company's or payer's explanation of benefits.
- Workers Compensation refers to a workers' compensation insurance plan(s).

FIG # 4-2

3. Forty-Five Day Review: It is mutually agreed that HCA has forty-five days from the day the bill(s), financial agreements, medical records, full health plan description and EOBs are received by HCA to review the accuracy of the information supplied by Seller and to terminate this Agreement at HCA's discretion.

4. Responsibilities of Seller: In addition to its obligations under this Agreement and any other agreements between the parties, Seller is responsible for:

A. When a creditor or an agent (i.e. Collection company or law firm working on behalf of the provider) contacts Seller about the outstanding balance, Seller agrees to respond simply as follows, "please contact [Name of Entity], Inc as they are financially responsible for the bill."

B. Within seven (7) days of the execution of this agreement, Seller will forward the latest insurance statements (a.k.a. explanation of benefits) that relate to the bills listed in Section 1.

C. Seller will comply with all requests for information and additional materials by HCA. All questions and requests will be completed by Seller as quickly as possible. As a standard, it is reasonable to have questions answered within seven (7) days and requests for materials delivered within fourteen (14) days.

D. Seller agrees to forward copies of all bills, collection notices, legal notices and other to HCA within five (5) days of receipt by Seller until the bill(s) accepted by HCA (listed in Section 1) are settled.

E. There is a possibility that the bills accepted by HCA in Section 1 have or will be sent to a collections company or law firm. While HCA is the guarantor for the bills, HCA cannot guarantee that the bill(s) have not or will not be sent to a collections company, law firm, reported to a collection company; or other actions taken by the provider. Further, HCA cannot guarantee that the provider, collection company or law firm will leave you alone as HCA cannot control, and is not responsible for, the actions of the collections companies, credit reporting companies, law firm, provider or other third parties. Further, HCA is not a credit repair company and Seller must repair his/her own credit history.

F. Seller agrees to provide HCA with HIPAA consent forms when necessary thereby allowing HCA to obtain documents (i.e. medical records, invoices, etc) from the provider, insurer and/or third party that HCA determines necessary to satisfy the provider's claim/bill.

G. It is mutually agreed that Seller hereby assigns and transfers any and all insurance benefits for the bill(s) described in Section 1 to HCA and that any money paid by an insurance company or third party for the debt will be endorsed over to HCA and mailed to HCA. Seller further agrees to pay all

FIG # 4-3 legal expenses associated with collecting said funds if Seller fails to send payment from the insurer or third party.

H. If litigation is commenced in relation to the medical bills(s) listed in Section 1, Seller agrees to make reasonable efforts to assist HCA as needed during the lawsuit including but not limited to, providing documents, answering questions, participating in depositions and other things deemed necessary to support HCA's position during the litigation.

I. Seller will notify his/her insurance company of the total amount they paid for the medical care in the event the amount of the medical debt is applied to Seller's deductible or other.

5. Representations and Warranties of Seller:

A. The execution and delivery of this Agreement, and the performance by Seller of its obligations hereunder, have been duly authorized by all necessary parties on the part of Seller.

B. This Agreement has been duly executed and delivered by

Seller and is a legal, valid and binding obligation of Seller, enforceable against Seller in accordance with its terms.

C. Seller verifies that the bills being presented are accurate and that there are no additional charges, fees or other outstanding debts in connection with the bills listed in Section 1 of this Agreement.

D. All documents and work product are the property of HCA and considered confidential as they contain confidential/trade secret information.

E. The bills described in Section 1 of this Agreement are either not in collections or have been in collections for less than 60 days. Further, Seller certifies that there has been no threat of any legal action in an effort to collect on the outstanding bills described in Section 1.

F. HCA may share account data with the sales agent or third party broker for the purpose of reconciling any commissions or other financial issues. Private medical data will not be shared.

G. Insurance companies and other payers occasionally retract payment when they discover a payment was made in error. Seller agrees that any retracted payment(s) are not the responsibility of HCA and HCA is not liable for any loss or damages as a result of the retracted payment(s). FIG # 4-4

6. Indemnification:

A. Seller Indemnification Obligations:

Seller shall indemnify and defend HCA, its representatives, officers, directors, employees, agents, successors and assignees (the "Seller INDEMNIFIED PARTIES") and hold the Seller INDEMNIFIED PARTIES harmless from and against any and all damages, based upon, attributable to, arising out of, or resulting from:

(i) The breach by Seller of any provision of this Agreement.

(ii) Promises, mis-representations and incorrect statements made by any third party, including sales agents or brokers, regarding HCA and this Agreement.

(iii) Though HCA is the guarantor of the bills described in Section 1 of this Agreement, there is a chance that the bills may still be sent to a collection company or be placed as a black mark on the Seller's credit history in error. In such situations, Seller will not hold HCA responsible for the actions of the creditor(s) and Seller is responsible for contacting the credit agency to have the adverse credit mark removed from the Seller's credit report.

B. HCA Indemnification Obligations:

HCA shall indemnify Seller (the "HCA INDEMNIFIED PARTIES") and hold the HCA INDEMNIFIED PARTIES harmless from and against any and all damages, including, without limitation, based upon, attributable to, arising out of, or resulting from the breach of any covenant or other agreement on the part of HCA under this Agreement.

(i) Promises, mis-representations and incorrect statements made by HCA to the Seller.

(ii) If legal action by the provider is initiated for non-payment of the bill(s) accepted by HCA (in Section 1) against Seller, HCA agrees to indemnity, defend and hold harmless ("assume the defense") Seller in the legal action. This clause is void if the legal action involves fraud, misrepresentation(s), a retracted payment by a payer, a breach of an agreement between the plaintiff and Seller, or other action that is not for the excusive reason of payment of the medical bill.

7. Confidential Information:

FIG # 4-5

A. It is mutually agreed that this Agreement is confidential and will not be disclosed unless pursuant to a court order.

B. During the term of this Agreement, and at all times thereafter, each of the parties hereto agree: (i) not to, directly or indirectly, disclose, utilize or permit the unauthorized use or disclosure of any proprietary and/or confidential information, oral or written, with regard to its respective business, operations, methodologies, clients or other confidential information (collectively called the "CONFIDENTIAL INFORMATION"); and (ii) that each originating party's respective CONFIDENTIAL INFORMATION shall remain the sole property of such originating party. Notwithstanding the foregoing, this restriction shall not apply to information which an originating party releases to the general public or to third parties without restriction, or to information which is disclosed pursuant to judicial order or regulatory proceeding or to information that is published or becomes public knowledge through sources other than the parties listed in this Agreement. The confidentiality obligations of the parties hereof shall survive any termination of this Agreement. Further, it is agreed that all work product is confidential and property of HCA.

8. Termination: Should Seller breach any of the terms contained herein or make a material misrepresentation, HCA is entitled to return the medical bill(s) and Seller's money and terminate this Agreement.

9. Interpretation: The Parties hereto acknowledge and agree that (i) the rule of construction providing that any ambiguities are resolved against the drafting Party will not apply in interpreting the terms and provisions of this Agreement; and (ii) the terms and provisions of this Agreement will be construed fairly as to all Parties hereto and not in favor of or against a Party, regardless of which Party was generally responsible for the preparation of this Agreement.

10. Entire Agreement: This Agreement constitutes the entire Agreement between the parties hereto with respect to the subject matter hereof and supersedes all prior agreements, either written or oral, of the parties hereto concerning the subject matter hereof.

11. Venue & Governing Law: This Agreement shall be governed by, interpreted and construed in accordance with the laws of the Commonwealth of Pennsylvania. Venue is Philadelphia, PA.

12. Dispute and Arbitration: In the event the parties should have a dispute between them arising from or related to this Agreement, and which dispute cannot be resolved by mutual agreement of the parties, the parties hereby agree that Seller must file for arbitration in Philadelphia, PA. Any such arbitration shall be determined by one arbitrator taking sworn testimony, in accordance with the Commercial Rules of the American Arbitration Association. The arbitrator shall be determined in the following manner: Within thirty (30) days from the filing for arbitration, both parties shall submit a list of three arbitrator candidates to the other party. The parties shall select from the submitted lists one candidate to be the sole arbitrator. If within sixty (60) days from the filing for arbitration the parties can not agree on one arbitrator, then the arbitration shall be decided by a panel of three arbitrators, whereby each party shall immediately select one arbitrator and those two arbitrators shall then select a third arbitrator. The parties hereof hereby agree to accept and to abide by the arbitrator(s)' judgment of determination or award, which determination or award may be entered in any court having jurisdiction.

For purposes of this Section 13, filing for arbitration shall be deemed to mean the delivery of notice by the filing party to the other party of the filing party's decision to seek resolution of a dispute by the means of arbitration.

13. Waiver and Amendment: No waiver or amendment of this Agreement shall be effective unless it is in writing and is signed by a duly authorized person of each respective party. The failure of either party to enforce any provision of this Agreement shall not constitute a waiver by either party of any provision. The past waiver of a provision by either party shall not constitute a course of conduct or pre-suppose a waiver in the future of that same provision.

By Clicking Submit You Are Agreeing to This Agreement:

STEP-IN AGREEMENT

Date: [Variable: date field]

[Variable: Party's Name]
[Variable: Address]
[Variable: City, State Zipcode]

Re: Letter of Understanding

Dear [Variable: Party's Name]:

Please accept this as a letter of understanding between you (herein referred to as "Seller") and [Name of Entity], Inc (herein referred to as "HCA"). The basis of this understanding is that HCA will "Step-in" and settle the debt liability(s) listed in Section 1 of this letter of understanding based on the following mutually agreed upon terms:

1. Cost and Step-in Status   #120

Seller agrees to pay HCA the sum of $[variable field] to incur and accept the liability(s) for the medical bills outlined in the table below and it is mutually agreed that Seller's responsibility for the debt has been fulfilled with said payment.

[Variable: the table below is from the data inputted in Fig. 1]

| Provider Name (city/state) | Patient Name | Date of Service | Total Owed | Provider Acct# |
|---|---|---|---|---|
| [variable field] | [variable field] | [variable field] | [variable field] | [variable field] |

3. Definitions: Capitalized terms used in this Agreement shall have the meanings as ascribed to them herein.
- A "Seller" is the person who is responsible for the medical bill(s) and is the insurance beneficiary (i.e. the patient, child's guardian).
- The "Agreement" refers to this letter of understanding.
- The 'purchase of the debt' or 'purchase of your medical bill' as advertised, is in the form of a discounted payment/responsibility by Seller for the debt listed in Section 1.
- An "EOB" is an insurance company's or payer's explanation of benefits.
- Workers Compensation refers to a workers' compensation insurance plan(s).

FIG # 5-2

4. Forty-Five Day Review: It is mutually agreed that HCA has forty-five days from the day the bill(s), financial agreements, medical records, full health plan description and EOBs are received by HCA to review the accuracy of the information supplied by Seller and to terminate this Agreement at HCA's discretion.

5.   Responsibilities of Seller: In addition to its obligations under this Agreement and any other agreements between the parties, Seller is responsible for:

A.   When a creditor or an agent (i.e. Collection company or law firm working on behalf of the provider) contacts Seller about the outstanding balance, Seller agrees to respond simply as follows, "please contact [Name of Entity], Inc as they are financially responsible for the bill."

B.   Within seven (7) days of the execution of this agreement, Seller will forward the latest insurance statements (a.k.a. explanation of benefits) that relate to the bills listed in Section 1.

C. Seller will comply with all requests for information and additional materials by HCA. All questions and requests will be completed by Seller as quickly as possible. As a standard, it is reasonable to have questions answered within seven (7) days and requests for materials delivered within fourteen (14) days.

D. Seller agrees to forward copies of all bills, collection notices, legal notices and other to HCA within five (5) days of receipt by Seller until the bill(s) accepted by HCA (listed in Section 1) are settled.

E. There is a possibility that the bills accepted by HCA in Section 1 have or will be sent to a collections company or law firm. While HCA has accepted responsibility for the bills, HCA cannot guarantee that the bill(s) have not or will not be sent to a collections company, law firm, reported to a collection company; or other actions taken by the provider. Further, HCA cannot guarantee that the provider, collection company or law firm will leave you alone as HCA cannot control, and is not responsible for, the actions of the collections companies, credit reporting companies, law firm, provider or other third parties. Further, HCA is not a credit repair company and Seller must repair his/her own credit history.

F. Seller agrees to provide HCA with HIPAA consent forms when necessary thereby allowing HCA to obtain documents (i.e. medical records, invoices, etc) from the provider, insurer and/or third party that HCA determines necessary to satisfy the provider's claim/bill.

G. It is mutually agreed that Seller hereby assigns and transfers any and all insurance benefits for the bill(s) described in Section 1 to HCA and that any money paid by an insurance company or third party for the debt will be endorsed over to HCA and mailed to HCA. Seller further agrees to pay all

FIG # 5-3 legal expenses associated with collecting said funds if Seller fails to send payment from the insurer or third party.

H. If litigation is commenced in relation to the medical bills(s) listed in Section 1, Seller agrees to make reasonable efforts to assist HCA as needed during the lawsuit including but not limited to, providing documents, answering questions, participating in depositions and other things deemed necessary to support HCA's position during the litigation.

I. Seller will notify his/her insurance company of the total amount they paid for the medical care in the event the amount of the medical debt is applied to Seller's deductible or other.

6. Representations and Warranties of Seller:

A.    The execution and delivery of this Agreement, and the performance by Seller of its obligations hereunder, have been duly authorized by all necessary parties on the part of Seller.

B.    This Agreement has been duly executed and delivered by

Seller and is a legal, valid and binding obligation of Seller, enforceable against Seller in accordance with its terms.

C. Seller verifies that the bills being presented are accurate and that there are no additional charges, fees or other outstanding debts in connection with the bills listed in Section 1 of this Agreement.

D. All documents and work product are the property of HCA and considered confidential as they contain confidential/trade secret information.

E. The bills described in Section 1 of this Agreement are either not in collections or have been in collections for less than 60 days. Further, Seller certifies that there has been no threat of any legal action in an effort to collect on the outstanding bills described in Section 1.

F. HCA may share account data with the sales agent or third party broker for the purpose of reconciling any commissions or other financial issues. Private medical data will not be shared.

G. Insurance companies and other payers occasionally retract payment when they discover a payment was made in error. Seller agrees that any retracted payment(s) are not the responsibility of HCA and HCA is not liable for any loss or damages as a result of the retracted payment(s).

FIG # 5-4

7. Indemnification:

A.    Seller Indemnification Obligations:

Seller shall indemnify and defend HCA, its representatives, officers, directors, employees, agents, successors and assignees (the "Seller INDEMNIFIED PARTIES") and hold the Seller INDEMNIFIED PARTIES harmless from and against any and all damages, based upon, attributable to, arising out of, or resulting from:

(i)    The breach by Seller of any provision of this Agreement.

(ii)    Promises, mis-representations and incorrect statements made by any third party, including sales agents or brokers, regarding HCA and this Agreement.

(iii) Though HCA has accepted the liability(s) for the bills described in Section 1 of this Agreement, there is a chance that the bills may still be sent to a collection company or be placed as a black mark on the Seller's credit history in error. In such situations, Seller will not hold HCA responsible for the actions of the creditor(s) and Seller is responsible for contacting the credit agency to have the adverse credit mark removed from the Seller's credit report.

B.    HCA Indemnification Obligations:

HCA shall indemnify Seller (the "HCA INDEMNIFIED PARTIES") and hold the HCA INDEMNIFIED PARTIES harmless from and against any and all damages, including, without limitation, based upon, attributable to, arising out of, or resulting from the breach of any covenant or other agreement on the part of HCA under this Agreement.

(i) Promises, mis-representations and incorrect statements made by HCA to the Seller.

(ii) If legal action by the provider is initiated for non-payment of the bill(s) accepted by HCA (in Section 1) against Seller, HCA agrees to indemnity, defend and hold harmless ("assume the defense") Seller in the legal action. This clause is void if the legal action involves fraud, misrepresentation(s), a retracted payment by a payer, a breach of an agreement between the plaintiff and Seller, or other action that is not for the excusive reason of payment of the medical bill.

8. Confidential Information:

FIG # 5-5

A. It is mutually agreed that this Agreement is confidential and will not be disclosed unless pursuant to a court order.

B. During the term of this Agreement, and at all times thereafter, each of the parties hereto agree: (i) not to, directly or indirectly, disclose, utilize or permit the unauthorized use or disclosure of any proprietary and/or confidential information, oral or written, with regard to its respective business, operations, methodologies, clients or other confidential information (collectively called the "CONFIDENTIAL INFORMATION"); and (ii) that each originating party's respective CONFIDENTIAL INFORMATION shall remain the sole property of such originating party. Notwithstanding the foregoing, this restriction shall not apply to information which an originating party releases to the general public or to third parties without restriction, or to information which is disclosed pursuant to judicial order or regulatory proceeding or to information that is published or becomes public knowledge through sources other than the parties listed in this Agreement. The confidentiality obligations of the parties hereof shall survive any termination of this Agreement. Further, it is agreed that all work product is confidential and property of HCA.

9. Termination: Should Seller breach any of the terms contained herein or make a material misrepresentation, HCA is entitled to return the medical bill(s) and Seller's money and terminate this Agreement.

10. Interpretation: The Parties hereto acknowledge and agree that (i) the rule of construction providing that any ambiguities are resolved against the drafting Party will not apply in interpreting the terms and provisions of this Agreement; and (ii) the terms and provisions of this Agreement will be construed fairly as to all Parties hereto and not in favor of or against a Party, regardless of which Party was generally responsible for the preparation of this Agreement.

11. Entire Agreement: This Agreement constitutes the entire Agreement between the parties hereto with respect to the subject matter hereof and supersedes all prior agreements, either written or oral, of the parties hereto concerning the subject matter hereof.

12. Venue & Governing Law: This Agreement shall be governed by, interpreted and construed in accordance with the laws of the Commonwealth of Pennsylvania. Venue is Philadelphia, PA.

13. Dispute and Arbitration: In the event the parties should have a dispute between them arising from or related to this Agreement, and which dispute cannot be resolved by mutual agreement of the parties, the parties hereby agree that Seller must file for arbitration in Philadelphia, PA. Any such arbitration shall be determined by one arbitrator taking sworn testimony, in accordance with the Commercial Rules of the American Arbitration Association. The arbitrator shall be determined in the following manner: Within thirty (30) days from the filing for arbitration, both parties shall submit a list of three arbitrator candidates to the other party. The parties shall select from the submitted lists one candidate to be the sole arbitrator. If within sixty (60) days from the filing for arbitration the parties can not agree on one arbitrator, then the arbitration shall be decided by a panel of three arbitrators, whereby each party shall immediately select one arbitrator and those two arbitrators shall then select a third arbitrator. The parties hereof hereby agree to accept and to abide by the arbitrator(s)' judgment of determination or award, which determination or award may be entered in any court having jurisdiction.

For purposes of this Section 13, filing for arbitration shall be deemed to mean the delivery of notice by the filing party to the other party of the filing party's decision to seek resolution of a dispute by the means of arbitration.

14.    Waiver and Amendment: No waiver or amendment of this Agreement shall be effective unless it is in writing and is signed by a duly authorized person of each respective party. The failure of either party to enforce any provision of this Agreement shall not constitute a waiver by either party of any provision. The past waiver of a provision by either party shall not constitute a course of conduct or pre-suppose a waiver in the future of that same provision.

By Clicking Submit You Are Agreeing to This Agreement:

Submit | Reset

Date: [Variable: date field]

[Variable: Party's Name]
[Variable: Address]
[Variable: City, State Zipcode]

Re: Assignment of Debt

Dear [Variable: Party's Name]:

This letter confirms that ABC Company has accepted assignment, and is responsible, for the debt listed below. If there are any questions, please have them contact us directly.

ABC Company is responsible for the debts indicated below:

| Provider Name (city/state) | Patient Name | Date of Service | Total Owed | Provider Acct# |
|---|---|---|---|---|
| [variable field] | [variable field] | [variable field] | [variable field] | [variable field] |

Sincerely,

ABC Company

FIG # 7

Date: [Variable: date field]

[Variable: Party's Name]
[Variable: Address]
[Variable: City, State Zipcode]

Re: Primary Guarantor for the debt

Dear [Variable: Party's Name]

This letter confirms that ABC Company is the primary guarantor for the debt listed below. If there are any questions, please have them contact us directly.

ABC Company is responsible for the debts indicated below:

| Provider Name (city/state) | Patient Name | Date of Service | Total Owed | Provider Acct# |
|---|---|---|---|---|
| [variable field] | [variable field] | [variable field] | [variable field] | [variable field] |

Sincerely,

ABC Company

FIG # 8

Date: [Variable: date field]

[Variable: Party's Name]
[Variable: Address]
[Variable: City, State Zipcode]

Re: Responsibility for payment

Dear [Variable: Party's Name]:

This letter confirms that ABC Company is responsible for payment of the debt listed below. If there are any questions, please have them contact us directly.

ABC Company is responsible for the debts indicated below:

| Provider Name (city/state) | Patient Name | Date of Service | Total Owed | Provider Acct# |
|---|---|---|---|---|
| [variable field] | [variable field] | [variable field] | [variable field] | [variable field] |

Sincerely,

ABC Company

FIG # 9

ANALYSIS RESULTS FOR:

I. Seller Contact Information:

Full Name: John Doe
Address: 123 East St
City, State Zip: Orange, WI 38281
Tel#: 555-1212
Email: na@na.com II. Details of the debt:

| Provider Name (address/city/state) | Patient Name | Date of Service | Total Owed | Provider Acct# |
|---|---|---|---|---|
| ABC Provider, York, PA | John Doe | 03/01/2011 | $3,933.22 | 47892 |

III. Post Analysis Results:

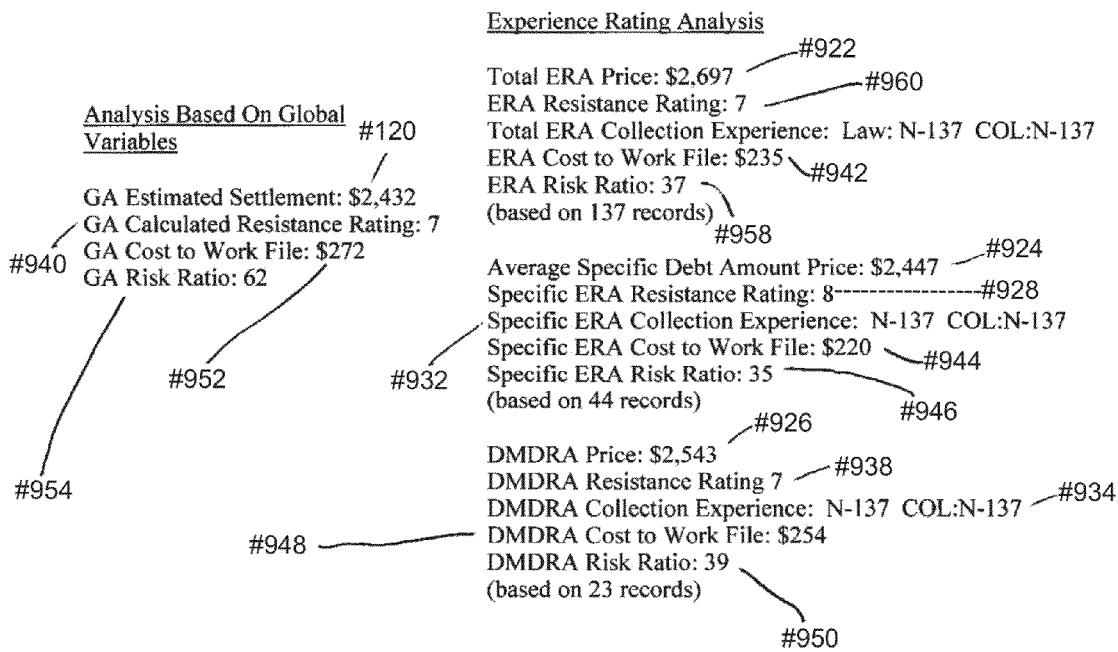

Analysis Based On Global Variables #120

GA Estimated Settlement: $2,432
GA Calculated Resistance Rating: 7
GA Cost to Work File: $272
GA Risk Ratio: 62

940
952
932
954
948

Experience Rating Analysis

Total ERA Price: $2,697  #922
ERA Resistance Rating: 7  #960
Total ERA Collection Experience: Law: N-137 COL:N-137
ERA Cost to Work File: $235  #942
ERA Risk Ratio: 37
(based on 137 records)
958

Average Specific Debt Amount Price: $2,447  #924
Specific ERA Resistance Rating: 8  #928
Specific ERA Collection Experience: N-137 COL:N-137
Specific ERA Cost to Work File: $220  #944
Specific ERA Risk Ratio: 35
(based on 44 records)
926   #946

DMDRA Price: $2,543
DMDRA Resistance Rating 7  #938
DMDRA Collection Experience: N-137 COL:N-137  #934
DMDRA Cost to Work File: $254
DMDRA Risk Ratio: 39
(based on 23 records)
950

FIG. 11

[COMPANY LETTERHEAD]

[Date]

[Name of patient]
[Address]
[City, State Zipcode]

Re: Purchase of your patient responsibility

Dear [Name of patient]:

Per the enclosed Explanation of Benefits your patient responsibility is $3,933.22. If you desire, [Name of Company] will purchase the "patient responsibility" portion of your debt per our standard terms and conditions for $2,130.00.

If you desire to sell your debt you may do this online or via US. Mail. If you desire to sell the responsibility online then go to www.[url].com and enter the code [Code #]. You will then be prompted to complete the transaction.

If you desire to us the US Mail, simply check the box below and enter your credit card information or enclose a check and mail back to [Company]

---------------------------------------- CUT HERE ------------------------------------------

Claim # 378943798   Patient Responsibility: $3,933.22   Accepting Amount: $2,130.00

By Signing her I agree to the terms and conditions of [Company]:_____

Type of Credit Card:_____
Card #:_____   Security Code:_____ Exp date:_____

FIG. 12

NON-CONTRACTED NEGOTIATED DISCOUNT GUIDELINES

BILLED CHARGES $5,000.00 TO $ 9,999.99 will be eligible for a 5% discount $10,000.00 and over will be eligible for a 10% discount Please use these guidelines for future reference.

If any questions, please contact Patient Accounting, Negotiated Discounts @

Thanks

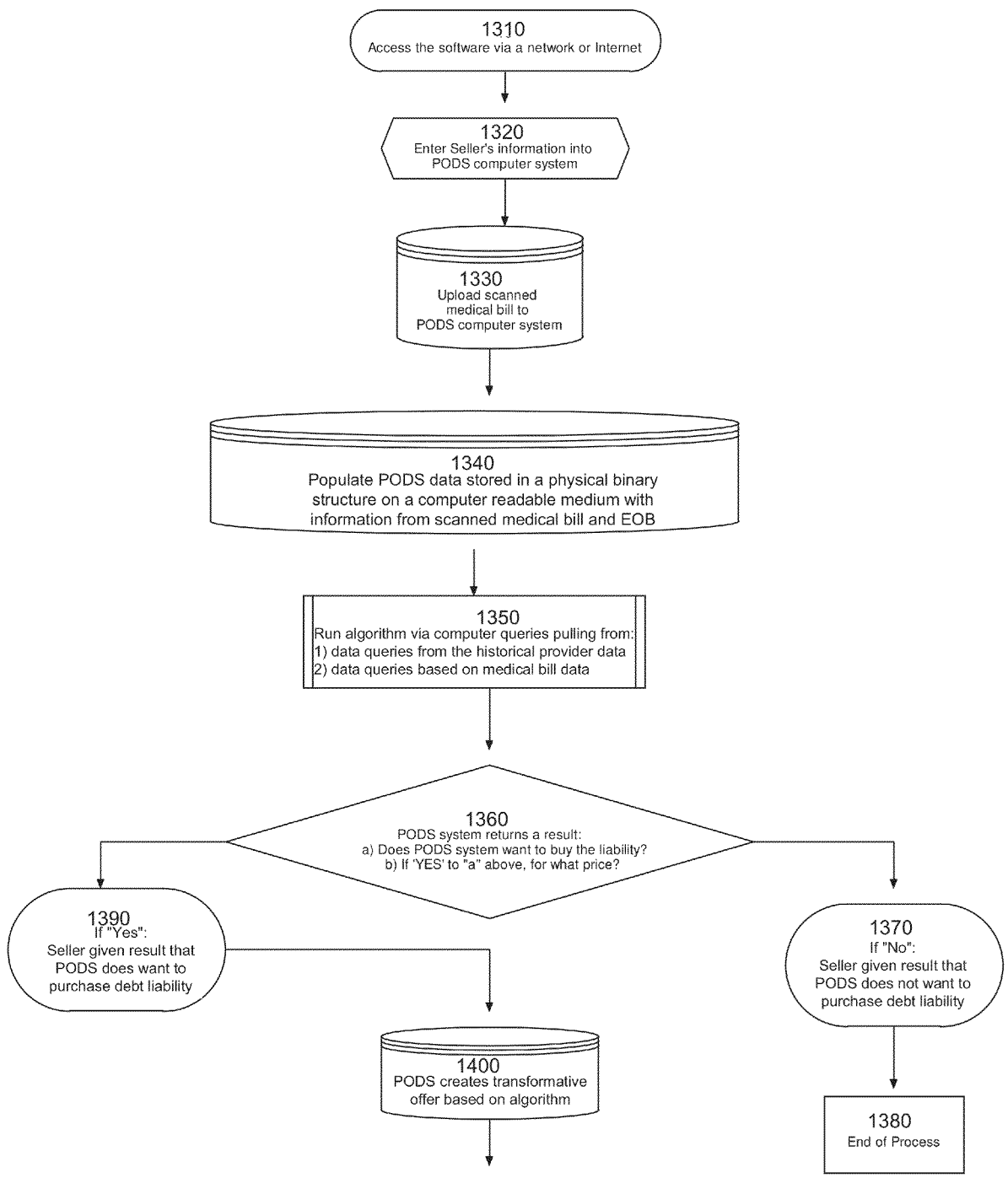

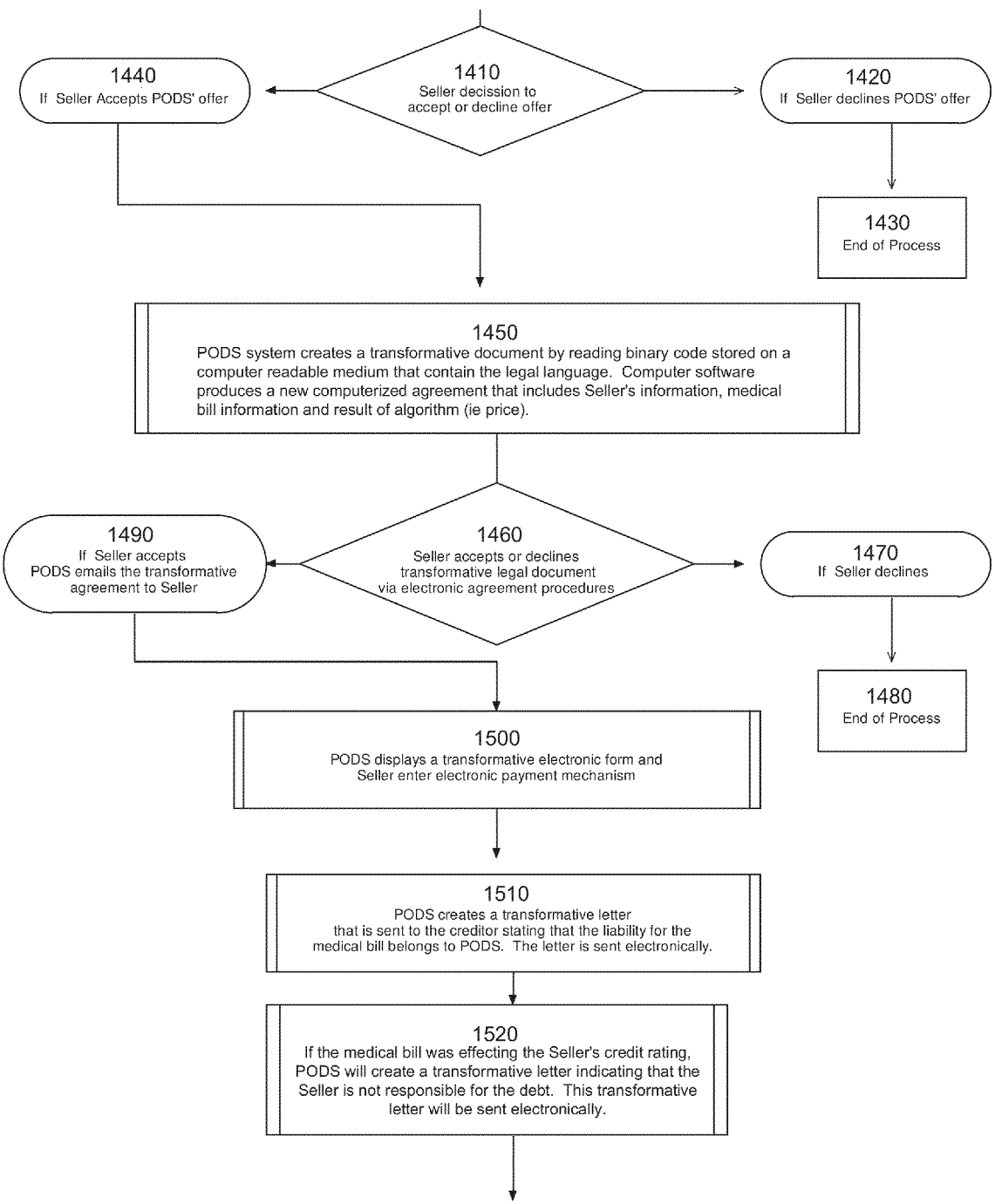

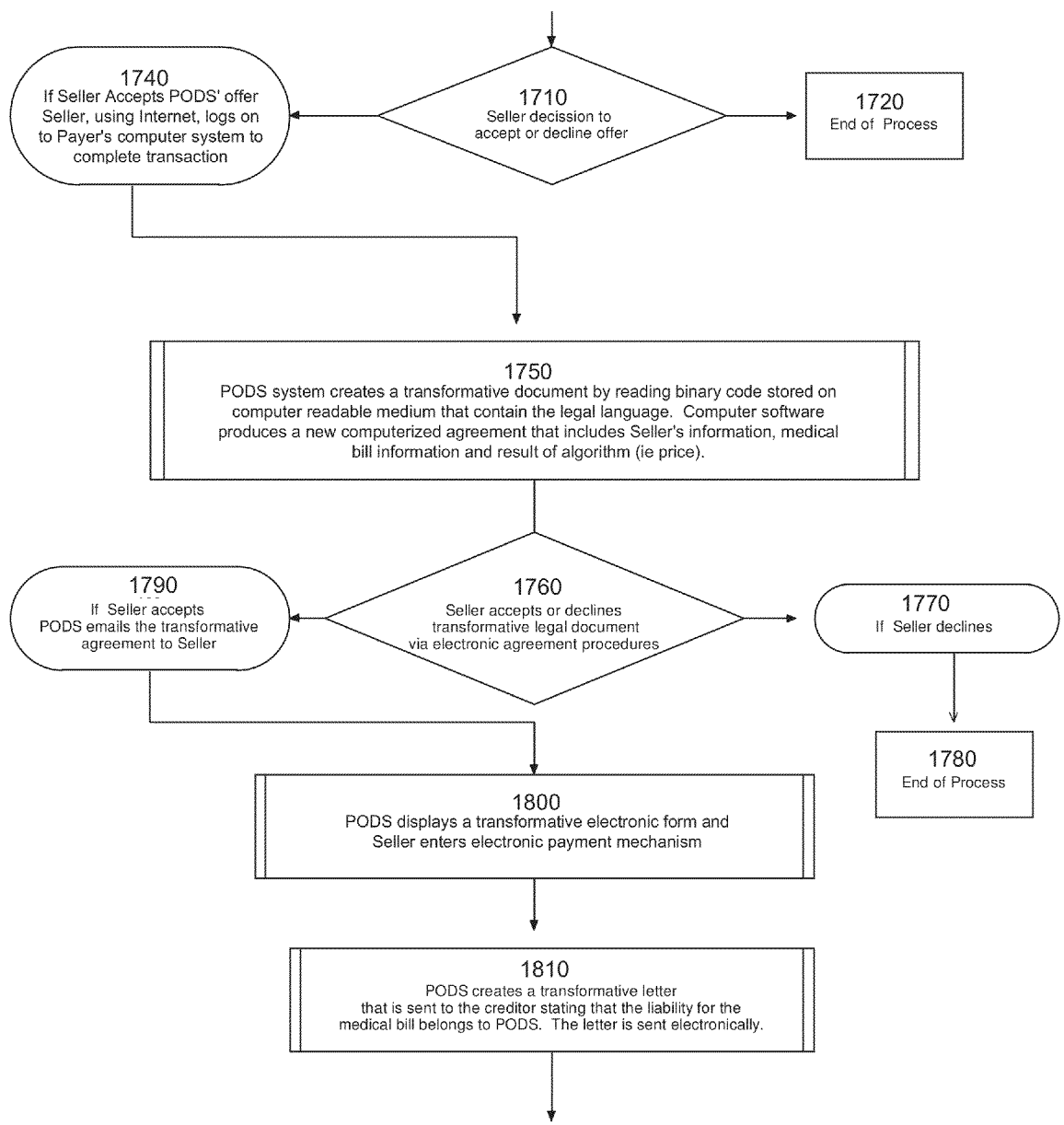

FIG. 15

OFFER TO ACCEPT DEBT LIABILITY

PODS entity will accept the liability for the account(s) listed below for $ [price]

Account Information For Debt:

| Provider Name (city/state) | Patient Name | Date of Service | Total Owed | Provider Acct# |
|---|---|---|---|---|
| [variable field] | [variable field] | [variable field] | [variable field] | [variable field] |

I Accept Offer     I Decline Offer

FIG. 16

BEST WAY TO APPRACH PROVIDER FOR DISCOUNT REPORT

Provider Name: ABC Physician

Account Information For Debt:

| Provider Name (city/state) | Patient Name | Date of Service | Total Owed | Provider Acct# |
|---|---|---|---|---|
| [variable field] | [variable field] | [variable field] | [variable field] | [variable field] |

Date to approach provider for a discount:     June 1, 2012 *

* The fiscal year end is July, $31^{st}$ - approaching the facility two months in advance allows maximum leverage to obtain a lower settlement price]

Person to Approach at Provider Office/Facility: Mary

Based on the mathematical model, Mary is the best person to contact.
Below is the average discount per staff member.

Mary – average reduction on bills: 45%
Bob  – average reduction on bills: 26%
John – average reduction on bills: 0%
Jane – average reduction on bills: 22%

SYSTEM AND METHOD TO PROFIT BY PURCHASING UNSECURED DEBT AND NEGOTIATING REDUCTION IN AMOUNT DUE

CROSS-REFERENCE TO RELATED APPLICATIONS

The present application claims priority to U.S. Provisional Patent Application No. 61/498,835, filed Jun. 20, 2011. The contents of that application are hereby incorporated by reference.

FIELD OF THE INVENTION

This invention relates to a system and method for creating value in debt liabilities that do not have an asset attached to the debt (unsecured debt). Specifically, a debtor pays their debt, at a reduced price, to an assignee (or guarantor or step-in entity) who then accepts liability for the debt, allowing the debtor to realize a financial gain, then the assignee (or guarantor or step-in entity) applies a system and process allowing the assignee (or guarantor or step-in entity) to benefit by exploiting inefficiencies, billing errors, medical necessity, cash flow leverage, improper billing, over treating, negotiating, over billing, malpractice, re-pricing of the bill and other methods that may be applied to the outstanding debt so as to lower the actual amount due (aka outstanding debt) below the amount paid to the assignee (or guarantor or step-in entity) by the debtor. In cases where the system and process applied to the debt does not result in a financial gain to the assignee (or guarantor or step-in entity), a financial gain is then realized by working the margins on a larger set of debts, and while one instance may result in a loss, a systematic approach results in a financial gain over time.

BACKGROUND OF THE INVENTION

It is common knowledge in the medical community that medical bills contain billing errors, intentional upcoding, over charging, unbundling, over treating, CPT code errors, incorrect modifiers, medical errors, incorrect location, incorrect time units, medical necessity, use of an assistant surgeon, a surgeon billing who did not perform the operation and other inefficiencies that increase the amount of money owed by the patient/guarantor. It is also becoming more common for companies to negotiate down the patient's responsibility for the medical bill or to audit the bill for incorrect charges. Companies generally do this on a fee-for-service basis or on a contingency fee basis.

Purchasing debt liabilities from a creditor is not new. An example is ABC Company purchasing credit card debit from a credit card company for $0.06 on the dollar and then pursuing the debt for the full amount due from the debtor. Example, ABC Company will pay the credit card company $100,000 for $6,000,000 in debt owed to the credit card company. In this case, ABC Company bought the debt from the creditor so the debt had no asset attached to it in the form of repayment from cardholders as credit cards are unsecured loans.

Assuming debt as part of a larger asset purchase has also been common. An example is XYZ Corporation will sell an operating unit to 123 Corporation in exchange for stock in 123 Corporation and 123 Corporation assuming the full amount of an outstanding debt due. In this case, the assumption of the debt is part of the overall asset purchase, and is a mechanism used to provide consideration (consideration as used in contract law) in lieu of a cash payment.

Transferring debt as part of a business dissolution or marital divorce also is not new. In these situations, a court will order one party to pay an outstanding debt as part of the dissolution of the two parties. However, in this case, the debt is part of an asset liability distribution ordered by a court and is therefore applied in a different context than the present invention. For example, the debt is not sold to a third party.

Viatical Settlements also have become common Viatical Settlements use the practice of "assigning a benefit (a/k/a asset)" from an insurance company for the policy owner to a third party in exchange for paying the ongoing premiums and a monetary payment to the policy holder. As will be explained below, the present invention is different because only "debt" is being assigned/transferred/incurred, whereas Viatical Settlements transfer the monetary insurance benefit (the asset) and the on-going premium payments are made by the Viatical Settlement company to ensure there is no denial of a benefit payout due to non-payment of premiums.

A system and method is described that, unlike these prior art methods, allows an entity to create value in debt liabilities for unsecured debts. The invention is directed to such a system and method.

SUMMARY OF THE INVENTION

Patient Advocacy companies (often referred to as advocates in the health care industry) work to lower the patient's responsibility (i.e. the cost) of medical bills on a contingency fee, for a percentage of the savings, or flat fee basis. The present invention recognizes that if the medical debt is purchased the revenue margins increase dramatically. First, there is profit made due to negotiating a lower outstanding debt. Second, the advocacy company also may seek reimbursement from the insurance company(s) allowing a 2× (two fold) return on the investment when compared to strictly working the claim on a contingency fee basis. For example:

Mary has a $40,000 bill from a medical procedure that was denied by the insurance company. An advocacy company that fought the insurance company for reimbursement and won full reimbursement ($40K) would be paid 30% of the savings equaling, $12,000. If an entity using the system of the invention purchased the debt liability at a reduced cost (reduced cost to debtor) for $25,000, then fought the insurance company for the full $40,000 and won, then settled the bill with the provider for $20,000, the profit would be $45,000. Additional value to the patient/debtor is that once they assigned liability to the entity, they had no more financial exposure, potential bad credit ratings, pending lawsuits or other.

The present invention is different than the flat fee or contingency fee methods described above in that the person who owes the debt (herein "Debtor") is paying the person or entity implementing the purchase of debt system of the invention (herein "PODS") a reduced fee to accept assignment (or be the primary guarantor, or transfer, or act as the step-in entity) of the total liability, or to be the primary guarantor of the debt owed, or act as the step-in entity for the Debtor. The assignee, guarantor, or the step-in entity then applies the PODS system to obtain money from the payer and to reduce the debt liability to an amount that is lower than the amount the PODS entity received from Debtor. The result is a financial gain for both the Debtor and the PODS entity. Moreover, since the assignee, guarantor, or the step-in entity owns the debt, this approach overcomes a provider's policies of not working with a third party to negotiate resolution of a debt.

In an exemplary embodiment, the invention includes computer implemented methods, mathematical models and algorithms, computer systems, and computer readable storage media including instructions that when processed by a processor enable the processor to implement methods for an entity using the PODS system to realize a financial gain by purchasing debt at specific price and then obtaining insurance reimbursement and/or obtaining a lower settlement amount with the creditor. In exemplary embodiments, such method includes the steps of:

the Seller accesses the software via the Internet or PODs network;

the Seller enters information into software via an application programming interface;

the Seller uploads a scanned image of the medical bill and insurance statement (EOB) to the PODS computer system;

the PODS computer system stores the entered information in a physical binary structure that is stored on a computer readable storage medium as a PODS database;

the PODS computer system then scans the medical bill and EOB and populates the PODS database with this data; and the PODS computer system executes queries that contain mathematical models and algorithms over the data stored in the PODS database and results are produced.

In the exemplary embodiment, execution of the mathematical models and algorithms includes executing computer code that processes historical data of past settlements in order to predict the provider's settlement price. This query returns a few different results (each based on a different mathematical model) so that the PODS computer system may evaluate the predicted settlement price in different ways. Execution of the mathematical models and algorithms also includes executing computer code that processes the data inputted by the Seller to predict the provider's settlement price. This method is strictly a mathematical model and does not use historic data. Based on the processing of the computer algorithms, a mathematical model and result is determined. The mathematical result is compared to pre-determined criteria to determine if the PODS computer system desires to purchase the debt liability based on pre-established criteria.

The PODS computer system returns a result to the Seller stating whether or not the user of the PODS computer system wants to purchase the debt or not. If the user of the PODS computer system does not want to make an offer to purchase the debt, it will state this on the computer display screen and the process ends. However, if the user of the PODS computer system does want to make an offer to purchase the debt, an appropriate indication will be displayed on the computer display screen. The Seller may then choose to accept or decline the offer. If the Seller declines the offer, then that is the end of the process. If the Seller chooses to accept the offer, then the PODS computer system will query the physical PODS database for the legal language and then make a transformative document inputting the Seller's information, the medical bill information, and the purchase price that was determined by the mathematical models. The transformative document will be displayed via a computer display and the Seller must decide whether he/she wants to decline or accept the offer to purchase the debt made by the PODS computer system. If the Seller declines the offer (the transformative documents containing legal language), then that is the end of the process. If the Seller does accept the offer made by the PODS computer system, then the PODS computer system will display payment information. This will be a software display where the Seller may enter his/her credit card or electronic checking information.

After payment is made by the Seller, the PODS computer system will create a transformative letter that will be sent electronically to the creditor stating that the user of the PODS computer system has assumed the liability for the debt. If the Seller's credit rating was affected by the outstanding medical bill, then the PODS computer system will generate a transformative letter by inputting specific data from the Seller's contact information and pre-determined contract language and email this letter to the Seller, or to the credit bureau (i.e. TransUnion, Equifax, Experian). The user of the PODS computer system will utilize his/her skill to i) seek reimbursement from a payer, negotiate with the creditor to accept a lower offer, obtain a grant or charity care to help lower or pay the medical bill, audit the medical bill for errors, identify another payer (i.e. malpractice carrier, homeowners), and/or find other ways to lower the debt. The results of the Seller's payment price and demographic details are entered into the PODS database. The results of the settlement of the medical debt are entered into the PODS database and process is then complete.

Among the benefits of this invention are the immediate decision by the algorithm (within 3 seconds) to purchase, or not purchase, the medical debt. This is very important because this helps to ensure the Seller will sell the medical debt. Behavioral studies show that the longer it takes and the more complicated the transaction, the less likely a consumer is to purchase a good. The improved timing further means that the user of the PODS computer system may conduct more transactions than would be possible by mere human interaction. The increased efficiencies also provide cost savings. Since the PODS computer system is faster, the timely filing issues associated with appeals and accounts being sent to collection are averted. If the system was tried via human means, there would be a delay in working files and there would be rejections on the part of payers with regards to appeals and increased difficulties with creditors because the delays would cause files to be sent to collection companies and lawyers for legal action. Such problems are averted by the PODS system of the invention.

BRIEF DESCRIPTION OF THE DRAWINGS

FIG. 1B is a sample computer display as in FIG. 1A except that it allows the Debtor to include an estimated payment by the insurance company. This is used if Debtor wants to sell the medical bill prior to insurance payments being made (i.e. at the time of service).

FIG. 7 is a sample financial responsibility letter, transformed based on the inputted data in FIG. 1A or FIG. 1B, sent to the Debtor via electronic means for use to repair credit history and for presentation to the creditor or the creditor's agent(s). This process is used when the PODS entity is acting as the guarantor of the debt.

FIG. 8 is a sample financial responsibility letter, transformed based on the inputted data in FIG. 1A or FIG. 1B, sent to the Debtor via electronic means for use to repair credit history and for presentation to the creditor or the creditor's agent(s). This process is used when the PODS entity has utilized the "step-in" agreement and process.

FIG. 9 is a sample report of the estimated settlement amount.

FIG. 11 is a sample form that an insurance company using PODS would send to a Debtor to transfer the debt.

FIG. 12 is a sample provider policy on providing negotiated discounts for patients whose insurance company does not contract with the provider.

FIGS. 13A-13C together constitute a flowchart illustrating how the PODS process is implemented with the Seller via the PODS computer system.

FIGS. 14A-14C together constitute a flowchart on how the PODS computer system is incorporated and used by a payer (i.e. health insurance company).

FIG. 15 is a sample computerized display of an offer made to a Seller for the Seller to accept or decline the offer.

FIG. 16 is a sample computerized display of a report made to the PODS entity telling the best date to begin interactions with the provider and who, at the provider's office, to contact for the best result.

DETAILED DESCRIPTION OF THE INVENTION

Figures 1, 1A, 2, 3, 4, 5, 6:
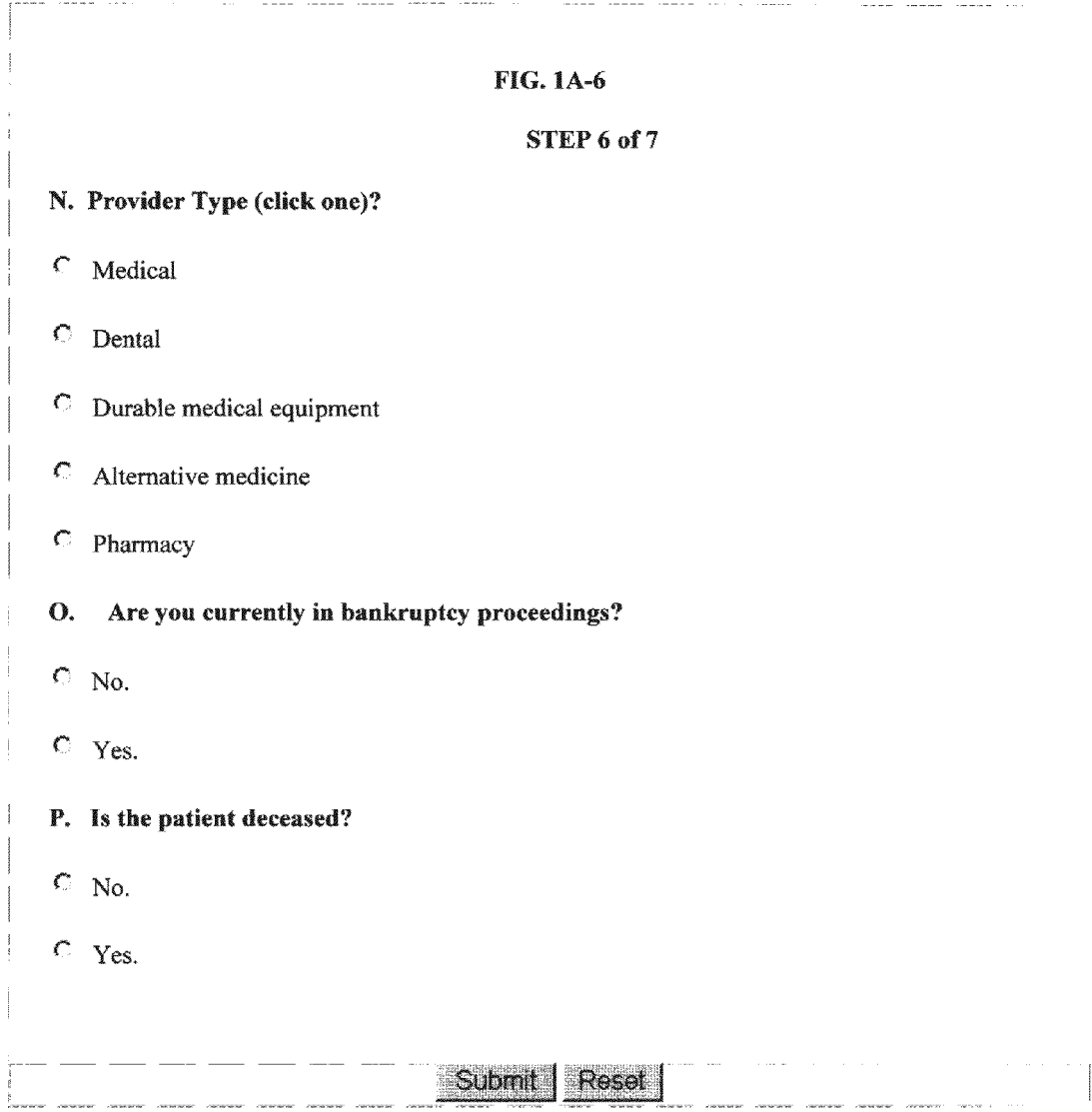
FIG. 1A is a sample computer display where a Debtor would input their contact information, answer relevant questions, and upload a scanned image of the invoice or information on the outstanding debt.
FIG. 2 is a system level diagram illustrating how the PODS computing environment is implemented.
FIG. 3 is a sample computer display that illustrates a sample end user agreement, utilizing assignment in the process, that has been transformed based on the information entered in FIG. 1A or FIG. 1B.
FIG. 4 is a sample computer display that illustrates a sample end user agreement, utilizing a guarantor (aka surety) in the process, that has been transformed based on the information entered in FIG. 1A or FIG. 1B.
FIG. 5 is a sample computer display that illustrates a sample end user agreement, utilizing a step-in entity in the process, that has been transformed based on the information entered in FIG. 1A or FIG. 1B.
FIG. 6 is a sample financial responsibility letter, transformed based on the inputted data in FIG. 1A or FIG. 1B, sent to the Debtor via electronic means for use to repair credit history and for presentation to the creditor or the creditor's agent(s). This process is used when the debt is being assigned to the PODS entity.

A detailed description of illustrative embodiments of the present invention will now be described with reference to FIGS. 1-18. Although this description provides a detailed example of possible implementations of the present invention, it should be noted that these details are intended to be exemplary and in no way delimit the scope of the invention.

DEFINITIONS

When used herein, the following terms will have the following meanings unless indicated otherwise:
A "provider" is a doctor, nurse, therapist, dentist, hospital, health clinic or any other person/entity that provides healthcare.
A "Debtor" is the person who owes the unsecured debt.
A "PODS entity" is the person or entity implementing the Purchase of Debt System ("PODS") described herein.
A "Seller" is the person selling the medical debt to the PODS entity.
The "Selling Price" is the price the Debtor would pay for the PODS entity to assume the debt liability.

"EOB" an industry term for a payer's explanation of benefits statement.
A "payer" is an insurance company, third party administrator, Medicare, Medicaid or other entity that provides health coverage.

Computer Variables:
The following variables will have the following meanings unless indicated otherwise:
"UID" refers to the provider's unique identification number in the data table.
"Provider" refers to the name of the provider and is identified by a unique number in the event there is more than one provider with the same name.
"DOS" refers to the "date of service" for the debt.
"DS" refers to the date the debt was settled.
"BAL" refers to the original outstanding balance of the bill.
"RES" refers to the difficulty or resistance the creditor gave in trying to settle the debt. In this instance, a rating system of 1 to 10 is used but any scale will work.
"STL" refers to the amount for which the creditor settled the debt.
"COL" refers to whether or not the provider placed a negative mark on the Debtor's or patient's credit rating (i.e. FICO score).
"LAW" refers to whether or not legal action was initiated.
"IN" refers to whether or not the provider was in-network with the insurance company. "HI" refers to whether or not the patient (a/k/a Debtor) had insurance at the time the debt was incurred.
"ELEC" refers to whether or not the procedure was an elective procedure.
"DED" refers to whether or not the balance was part of a deductible or co-insurance.
"CR" refers to the Debtor's credit rating (i.e. Transunion, Experian, Equifax, FICO score).
"M" refers to the name of the person at the facility with whom the debt was negotiated.
"ME" refers to whether or not the debt was related to a medical error.
"F" refers to the date of the provider's fiscal year end (accounting purposes).
"A" refers to whether or not the provider checked the "accept assignment" box on the claims form that was submitted to the payer.
"B" refers to whether or not the Debtor was in bankruptcy proceedings.
"P" refers to whether or not the Debtor was dead.
"PFS" refers to "potential for subrogation."

I. Overview of the Process

Step #1—The Debtor inputs data [FIG. 1A or FIG. 1B] and that data is transmitted over a network to the information server [FIG. 2 #218]. Data may also be stored in an electronic file and imported/transferred to the information server [FIG. 2 #218] via computer readable storage medium. At this time the Debtor will be offered financial protections as described in Section X below.

Step #2—The information server [FIG. 2 #218] will then execute computer code [FIG. 2 #230] to process the data inputted by the Debtor in accordance with predetermined algorithms and mathematical equations as described in Section IV, "Transformative Analysis of the Data."

Step #3—Offer to buy debt from the Debtor:
If the Debtor entered the data and the transaction is via a computer system only, go to Step #3A.
If the Debtor provided the data and is working with a natural person at the entity using the PODS system, go to Step #3B.

Step #3A—The Post Analysis Reporting per Section VI will be executed. The results for the calculated variables will populate the offer to sell the debt and populate the agreement [FIG. 3—alternative embodiments in FIG. 4 and FIG. 5]. The Debtor will then accept or decline the offer to sell the debt. In an alternative embodiment, the entity using the PODS system ("PODS entity") could request that the provider (a/k/a creditor) authorize the transfer of the debt (a/k/a novation) from the Debtor to the PODS entity. Another alternative embodiment is to allow the Debtor to input the total amount due and a price he/she is willing to pay to transfer the debt liability. Then, the PODS system would do the mathematical modeling and accept or decline the amount offered by the Debtor.

Step #3B—The Post Analysis Reporting per Section VI will be executed. The natural person using the PODS system will be presented with the anticipated settlement amount of the debt [FIG. 9]. Knowing the anticipated settlement amount, the person using the PODS system may then engage in an offer and acceptance discussion (or communication via IM, email, etc.) and determine a final amount for which the debt will be sold to the PODS entity. The Debtor will then accept or decline the offer to sell the debt. In an alternative embodiment, the PODS entity could request that the provider (a/k/a creditor) authorize the transfer of the debt from Debtor to the PODS entity. This complies with the legal concept of novation.

Step #4—Acceptance of offer by Debtor. If accepted by the Debtor, the offer and terms of the agreement [FIG. 3, FIG. 4 or FIG. 5] will be presented and the Debtor may "Accept" or "Decline" the offer. If the Debtor is not present, then the terms of the agreement [FIG. 3, FIG. 5 or FIG. 5] may be sent via US Mail, facsimile, emailed or conveyed over the phone. The Debtor would then agree to the terms or decline the offer. If the offer were accepted, then the entity using the PODS system would collect payment via a credit card, check, Paypal, distribution from a Flexible Spending Account (industry acronym "FSA"), distribution from a Healthcare Reimbursement Account (industry acronym "HAS"), or similar payment method and then continue to Step #5. Also, at this time the provider would be notified that the PODS entity is responsible for the debt. A financial responsibility letter [FIG. 6, FIG. 7, or FIG. 8] would be used for this purpose. If the Debtor did not accept the offer, the process would terminate at this time.

Step #5—Working the Debt. Per Section VII—Working the Debt, the debt will be worked after all insurance(s) have met (paid out or denied) their obligations in an effort to obtain a settlement and all charities and grants have been tried. An alternative embodiment includes accepting payment from the Debtor prior to the insurance paying. In such an embodiment, the estimated insurance payment [FIG. 1B #122] would be calculated into the price accepted by the PODS entity in order to accept the liability of the debt.

Step #6—Post Settlement Data. Per Section IX, all of the variables in the experience data table will be updated after the debt has been settled. This updated information may then be used for new transactions.

II. Collection of the Debtor's Data

The data needed from the Debtor may be obtained using a paper process or a computer implemented process.

The Paper Process

The Debtor, or their loved ones on their behalf, who have a debt will be interviewed and the variable fields in FIG. 1A or FIG. 1B will be filled in with the relevant information. After the data is inputted on paper, the information will be entered into the PODS system where the transformative analysis will be performed on the data resulting in the final price that the entity utilizing the PODS system would be willing to accept from the Debtor for the outstanding debt. This final dollar amount will then be filled in on the paper agreement.

The Process as Implemented by Computer Software

Software will present data like that illustrated in FIG. 1A or FIG. 1B. The Debtor will input the data requested, answer the questions asked, and upload an image of the invoice or information on the outstanding debt. The information will be transmitted over a computer network to the PODS system where the transformative analysis will occur. Once the transformative analysis has occurred, software will present an appropriate agreement to the Debtor via user interface as illustrated in FIG. 3, FIG. 4, or FIG. 5. The agreement will be presented with all of the variable fields 120 (FIG. 2) filled out with post analysis results.

Note: An alternative implementation is the image of the invoice may be emailed, sent via facsimile or other transmission mechanism, and the PODS entity would attach the image to the data received via FIG. 1A or FIG. 1B.

III. Creation of the Experience Data on a Readable Computer Medium

The experience data table [FIG. 2 #226] will be stored in a physical binary structure that is stored on a computer readable storage medium. Each time a debt is settled, the experience data table [FIG. 2 #226] will be populated with the results. This is how the experience data will be created and/or updated. Additionally, experience data may be acquired and merged into the experience data table 226 (FIG. 2) in a physical binary structure that is stored on the computer readable storage medium from data gathered by other organizations or is inputted from information gathered from a provider's written policies.

IV. Transformative Analysis of the Data

Determining the final price to accept from the Debtor for an outstanding debt is comprised of the processes and computer implemented algorithms described in this section.

Based on the input received from the user inputs in FIG. 1A or FIG. 1B, the name and address of the provider [FIG. 1A #100] is inputted into the system along with the other information and transmitted to the information gateway and server [FIG. 2 #218]. Data matching is conducted to match the provider information sent, with the unique provider identification (herein "UID") number in the experience database that is stored in a physical binary structure on computer readable memory [FIG. 2 #226]. The variables may be matched based on the provider's Tax ID number, the provider's name and address, the provider's National Provider Identifier number (their NPI number), or other ways.

Once the UID is identified, computer code is executed and a data analysis (via an algorithm) [FIG. 2 #230] is performed using and algorithm and mathematical model (described below) on the experience data table 226 and all the experience records for the UID are collected. Based on this information, additional data analysis is performed utilizing the data that was returned [FIG. 2 #238]. First, the data associated with the UID [FIG. 2 #238] is analyzed for the experience rating on all of the records for a given period of time (e.g., the past three (3) years) along with the number of records in the data table. Second, the data is analyzed based on a specific data set based on the amount of the debt. In this second analysis, the results will be based on the amount of the debt, plus and minus (+/−) a monetary variable given by the entity utilizing the PODS computer system [FIG. 2], along with the number of records in the temporary data table [FIG. 2 #238].

Example: The debt is $3,000. The monetary variable for the second data analysis is determined to be $500. In this case, the second data analysis will provide results for every experience data table record between $2,500 and $3,500 for that UID.

Third, the data is analyzed using the following analysis/algorithms/mathematical models, all of which are explained below:

i) Total Experience Rating Analysis ("Total ERA") and the Total ERA Risk Ratio;
ii) The Specific ERA and Specific ERA Risk Ratio;
iii) Direct Match Debt Amount Rating Analysis ("DMDRA") analysis and DMDRA Risk Ratio;
iv) The Global Analysis ("GA") and GA Risk Ratio;
v) Total ERA Collection Experience Results.

Total Experience Rating Analysis:

Based on the data inputted in FIG. 1A or FIG. 1B, the data variables described above will be used to develop the Total Experience Rating Analysis (herein "Total ERA"). The table below (Table #1), which is stored in a physical binary structure on computer readable storage medium, contains data elements over which the first software data algorithm is executed. The first software data algorithm extracts all records for the specific provider, via UID (variable "UID" in the data table below) from the experience data table [FIG. 2 #226]. The results of the data analysis by the algorithm are then written to a new, temporary, table [FIG. 2 #238] that is stored on a computer readable storage medium.

The second software data algorithm is then run over the new, temporary, data table [FIG. 2 #238]. The data analysis by this algorithm provides two results. Procedure #1, which will be herein referred to as "Total ERA" [FIG. 9 #922], is an experience rating based on the results of every data record in the new, temporary, table [FIG. 2 #238]. Specifically, for each record in the new table, the following mathematical model embodied in computer code will be run over the record and the result stored in computer memory:

Procedure #1—Result for each specific record

Procedure #1 Result=(STL/BAL)*100

Procedure #2—Compute the average for each record

Total ERA=(add all Procedure #1 Results together)/Total number of records

In short, Procedure #1 takes the average reduction of the debt in percent for every record for the specific provider (specific UID). Each result is then stored in computer random access memory. Procedure #2 takes the average of all the results for each record stored in memory and produces the "Total ERA" [FIG. 9 #922]. That variable, "Total ERA," is then stored in the computer's random access memory for use by the Post Analysis Reporting as described in Section VI, below.

While calculating the results for Total ERA, the computer code will also calculate the Total ERA Risk Ratio ("Total ERA RES") by averaging the RES results [FIG. 9 #960]. After the Total ERA RES is calculated, the Total ERA Cost to Work File [FIG. 9 #942] and the Total ERA Risk Ratio [FIG. 9 #958] will be determined Total ERA Cost to Work File=(((Total ERA RES in decimal form)*(average cost to work file))+fixed costs associated with working the file)

Total ERA Risk Ratio=(Total ERA RES/100).

It is noted that the "[Specific Calculation: Total ERA, Specific ERA, DMDRA, etc.] Cost To Work File" is a mathematical algorithm that predicts how much it will cost the PODS entity to obtain a settlement, while the "[Specific Calculation: Total ERA, Specific ERA, DMDRA, etc.] Risk Ratio" is a mathematical algorithm that predicts the chances that purchasing the debt will result in a monetary loss to the PODS entity.

If the Total ERA Cost to Work File [FIG. 9 #942] is greater than the Selling Price, where the Selling Price means the price the Debtor would pay for the PODS system to accept the debt liability, minus the Total ERA price [FIG. 9 #922], then no offer to purchase the debt will be made. Further, if the Total ERA Risk Ratio [FIG. 9 #958] is too high, as predetermined by the PODS entity, then no offer to purchase the debt will be made.

Specific ERA:

The second result, which will be referred to as "Specific ERA" [FIG. 9 #924], is based on a mathematical model embodied in computer code for each data record where the debt amount in the new data table is equal to the debt amount inputted [FIG. 1A #120], plus and minus, a dollar amount that was predefined by the entity using the PODS system. The same steps used to determine the "Total ERA" are used, the only difference being that the records analyzed are limited by the debt amount (variable BAL below in Table #1), plus and minus, a predetermined amount identified by the entity using the PODS system. That variable, "Specific ERA," is then stored in computer random access memory, or on computer readable storage medium, for use by the Post Analysis Reporting as described in Section VI, below. A Post Analysis report is used since large debts often get a bigger reduction than small debts.

While calculating the results for Specific ERA, the computer code will also calculate the Specific ERA RES by averaging the RES results [FIG. 9]. After the Specific ERA RES is calculated, the Specific ERA Cost to Work File [FIG. 9 #944] and the Specific ERA Risk Ratio [FIG. 9 #946] will be determined Specific ERA Cost to Work File=((Specific ERA RES in decimal form)*(average cost to work file))+fixed costs associated with working the file)

Specific ERA Risk Ratio=(Specific ERA RES/100).

If the Specific ERA Cost to Work File [FIG. 9. #944] is greater than Selling Price−Specific ERA price, then no offer to purchase the debt will be accepted. Further, if the Specific ERA Risk Ratio [FIG. 9 #946] is too high, as determined by the PODS entity, then no offer to purchase the debt will be made.

It is noted that the experience data should have enough records in it to develop a true statistical sampling. Further, records over 3 years, provided there are a sufficient number of records for a statistical sampling, should be deleted. The reason is because a provider's practices will change with new management and the best way to have analytical results reflect the way the creditor reacts to the PODS system is to use current data records only. This way, the experience data table is reflective of the creditor's actions at any given period in time.

TABLE #1

| UID-Provider | DOS | DS | BAL | STL | COL | LAW | RES | IN | HI | A | DED | ELEC | ME | B | P | CR | M | F |
|---|---|---|---|---|---|---|---|---|---|---|---|---|---|---|---|---|---|---|
| 1-ABC Physician | Jan. 18, 2007 | Mar. 8, 2008 | $323 | $180 | Y | N | 5 | Y | Y | N | N | N | N | N | N | 720 | Mary | 12/31 |

TABLE #1-continued

| UID-Provider | DOS | DS | BAL | STL | COL | LAW | RES | IN | HI | A | DED | ELEC | ME | B | P | CR | M | F |
|---|---|---|---|---|---|---|---|---|---|---|---|---|---|---|---|---|---|---|
| 2-ABC Physician | Jan. 28, 2008 | Jun. 8, 2008 | $2,543 | $1,902 | N | N | 5 | N | Y | Y | Y | N | N | N | N | 690 | Bob | 08/31 |
| 3-ABC Physician | Apr. 23, 2007 | Jul. 9, 2007 | $1,294 | $1,294 | N | N | 10 | Y | Y | Y | Y | N | N | N | N | 640 | John | 07/31 |
| 4-ABC Physician | Mar. 23, 2006 | Jun. 29, 2006 | $796 | $622 | N | N | 6 | N | Y | Y | N | N | N | N | N | 710 | Jane | 11/30 |
| 5-XYZ Hospital | Jan. 8, 2008 | Mar. 8, 2008 | $11,231 | $3,212 | N | N | 7 | N | N | N | N | N | N | N | N | 683 | Cindy | 01/30 |
| 6-XYZ Hospital | Jan. 8, 2008 | Jun. 8, 2008 | $22,633 | $2,392 | N | N | 8 | N | N | N | N | N | Y | N | N | 712 | Rick | 02/28 |
| 7-XYZ Hospital | Jan. 8, 2008 | Sep. 8, 2008 | $9,222 | $9,222 | N | N | 10 | Y | Y | Y | Y | N | N | N | N | 630 | Paul | 12/31 |
| 8-XYZ Hospital | Jan. 8, 2008 | Jan. 8, 2010 | $12,234 | $4,293 | Y | N | 7 | Y | Y | Y | N | N | N | N | N | 590 | Jack | 12/31 |
| 9-PDQ Clinic | Feb. 12, 2007 | May 4, 2008 | $543 | $123 | Y | N | 3 | Y | Y | Y | N | N | N | N | N | 643 | David | 12/31 |
| 10-PDQ Clinic | Apr. 4, 2007 | Dec. 6, 2008 | $2,234 | $980 | Y | N | 4 | N | Y | Y | N | N | N | N | N | 750 | Eric | 02/28 |

Direct Match Debt Amount Rating Analysis:

The mathematical model embodied in computer code for the Direct Match Debt Amount Rating Analysis (herein "DMDRA") is determined through the following process. After verifying that the UIDs match, the following steps will occur. Each record in the experience data table [FIG. 2 #226] where the variables listed below in Table #2 match the inputted variables in [FIG. 1A or FIG. 1B], will be determined to be a valid record and all the records will make a new, temporary, experience data table for this analysis [FIG. 2 #238].

Example

If the following fields match, then the record is inserted into the new, temporary, experience data table [FIG. 2 #238]:

TABLE #2

Inputted BAL = (BAL) +/− (a predefined variable in the new experience table).
Inputted COL = COL variable in the new experience table.
Inputted LAW = LAW variable in the new experience table.
Inputted IN = IN variable in the new experience table.
Inputted HI = HI variable in the new experience table.
Inputted DED = DED variable in the new experience table.
Inputted ME = ME variable in the new experience table.
Inputted A = A variable in the new experience table.

Once the new, temporary experience database [FIG. 2 #238] is created, computer code with a mathematical model embodied in computer code [FIG. 2 #230] in it will be run over the new experience data table. The code that will be run is the same as described in the Experience Rating Analysis (ERA) section above, the only difference being that valid records are determined if the variables listed in Table #2 described above match. The execution of this code will result with the variable DMDRA. That variable, "DMDRA", is then stored in computer RAM memory, or on a computer readable storage medium, for use by the Post Analysis Reporting as described in Section VI, below.

While calculating the results for DMDRA, the computer code will also calculate the DMDRA RES by averaging the RES results [FIG. 9 #938]. After the DMDRA RES is calculated the DMDRA Cost to Work File [FIG. 9 #948] and the DMDRA Risk Ratio [FIG. 9 #950] will be determined.

DMDRA Cost to Work File=((DMDRA RES in decimal form)*(average cost to work file))+fixed costs associated with working the file)

DMDRA Risk Ratio=(DMDRA RES/100).

If the DMDRA Cost to Work File [FIG. 9 #948] is greater than the Selling Price minus the DMDRA price, then no offer to purchase the debt will be made. Further, if the DMDRA Risk Ratio [FIG. 9 #950] is too high, as determined by the PODS entity, then no offer to purchase the debt will be made.

Global Analysis:

Based on the data inputted in [FIG. 1A or FIG. 1B], the variables described above and in Table #3 below will be used to develop the Global Analysis. The mathematical model embodied in computer code for the Global Analysis (herein referred to as "GA") is:

If FIG. 1A is used:

$$GA=(DED*(WV))+((BAL-DED)*((AG*(WV))*(HI*(WV))*(FAC*(WV))*(ELEC*(WV))*(IN*(WV))*(GEO*(WV))*(COL*(WV))*(LAW*(WV))*(LIB*(WV))*(ME*(WV))*(A*(WV))*(DEN*(WV))*(APL*(WV))*(CR*(WV))*(B*(WV))*(P*(WV))))*NCB$$

An alternative embodiment for out-of-network providers is:

$$GA=BAL*((AG*(WV))*(DED*(WV))*(HI*(WV))*(FAC*(WV))*(ELEC*(WV))*(IN*(WV))*(GEO*(WV))*(COL*(WV))*(LAW*(WV))*(LIB*(WV))*(ME*(WV))*(A*(WV))*(DEN*(WV))*(APL*(WV))*(CR*(WV))*(B*(WV))(P*(WV))))*NCB$$

If FIG. 1B is used as the input mechanism the mathematical model embodied in the software would be:

$$GA=(DED*(WV))+((BAL-(EP-DED))*((AG*(WV))*(HI*(WV))*(FAC*(WV))*(ELEC*(WV))*(IN*(WV))*(GEO*(WV))*(COL*(WV))*(LAW*(WV))*(LIB*(WV))*(ME*(WV))*(A*(WV))*(DEN*(WV))*(APL*(WV))*(CR*(WV))*(B*(WV))*(P*(WV))))*(NCB*(WV))$$

An alternative embodiment for out-of-network providers is:

$$GA=(BAL-EP)*((AG*(WV))*(DED*(WV))*(HI*(WV))*(FAC*(WV))*(ELEC*(WV))*(IN*(WV))*(GEO*(WV))*(COL*(WV))*(LAW*(WV))*(LIB*(WV))*(ME*(WV))*(A*(WV))*(DEN*(WV))*(APL*(WV))*(CR*(WV))*(B*(WV))*(P*(WV))))*(NCB*(WV))$$

It is noted that while the variables are multiplied to determine a final value, the mathematical operator which in the multiplication symbol in this implementation, may be substituted with other mathematical operators ("+", "−", "/", etc.).

TABLE #3

Whereas WV represents a weight variable. The weighted variable (WV) may be changed by the entity using the PODS system to meet their specific requirements for each variable. For ease of reading the variable WV is used. WV will be specific to each variable, the same WV variable value will not be used for each variable.
Whereas AG is the age of the debt.
Whereas FAC indicates if the provider is a facility (i.e. hospital), a medical provider office (i.e. doctor, physical therapist, speech therapist, dentist, durable medical equipment vendor, alternative medicine provider, etc.).
Whereas GEO indicates the geographical region of the provider.
Whereas LIB indicates if there is another payer that should pay the bill (i.e. worker's compensation, an auto insurance plan, home owner's plan or other).
Whereas DEN indicates whether or not the insurance company denied the claim(s).
Whereas APL indicates whether or not the Debtor completed the insurance company's appeal and grievances process.
Whereas EP is the estimated insurance(s) payment [FIG. 1B #122].
Whereas NCB is not covered benefit.

Each of the data elements listed above are weighted and based on them, an estimated settlement price is determined. The PODS entity will then add a multiplier for profit margins and the Debtor may accept or decline the offer to sell the debt.

Transforming the age of the debt into a useful result: The age of the debt will be split out into units based on a time interval (i.e. by month, number of days, etc.). Each unit will be assessed a value. That value will determine the weighted variable for AG.

Transforming the amount of the debt into a useful result: The amount of the debt will be split out into units. Example, each $100 unit will be assessed a value. That value will be used to determine the weighted variable for BAL.

Transforming if the debt is part of a deductible into a useful result: If the debt is wholly owed because it is part of a deductible or co-insurance, then it is assigned a value X; if it is not it will be assigned a value of Y. That value will be used to determine the weighted variable for DED.

Transforming if health insurance was in place at the time the debt was incurred into a useful result: If health insurance was in place at the time the debt was incurred, then it is assigned a value X; if it is not it will be assigned a value of Y. That value will be used to determine the weighted variable for HI.

Transforming if the provider was a facility or not into a useful result: If the provider to which the debt is owed is small like a medical office or a physician group, then it is assigned a value X; if it is not it will be assigned a value of Y. That value will be used to determine the weighted variable for FAC.

Transforming the procedure was elective or not into a useful result: If the procedure was elective, then it is assigned a value X, if it is not it will be assigned a value of Y. That value will be used to determine the weighted variable for ELEC.

Transforming the network status into a useful result: If the care was provided by an in-network provider, then it is assigned a value X, if it is not it will be assigned a value of Y. That value will be used to determine the weighted variable for N.

Transforming the geographic region of the provider into a useful result: If the provider is located in a highly populated geographical area will be assigned a value X, if it is not it will be assigned a value of Y. That value will be used to determine the weighted variable for GEO.

Transforming if the debt has been sent to a collections company into a useful result: If the debt is being managed by the provider, then it is assigned a value X; if it is not it will be assigned a value of Y. If there was a negative credit rating reported to a credit rating agency, it will be assigned the value Z. That value will be used to determine the weighted variable for COL.

Transforming if the provider used legal action(s) into a useful result: If legal action(s) was commenced, then it is assigned a value X, if it is not it will be assigned a value of Y. That value will be used to determine the weighted variable for LAW.

Transforming the liability of another insurer into a useful result: If the debt is entirely the liability of another insurance carrier, then it is assigned a value X, if it is partially the responsibility of another insurance carrier it will be assigned a value of Y. If there is no responsibility on the part of another insurance carrier, it will be assigned a value of Z. That value will be used to determine the weighted variable for LIB.

Transforming if the debt is associated with a medical error into a useful result: If the debt is associated with a medical error in some way, then it is assigned a value X, if it is not it will be assigned a value of Y. That value will be used to determine the weighted variable for ME.

Transforming if the claim(s) submitted to the payer for the debt was marked "accept assignment" into a useful result: If the claim sent to the payer was marked "accept assignment" and i) the primary insurer was Medicare or Medicaid; or ii) the state where the care was rendered has case law or a statue that states that by accepting assignment the provider must write-off the balance; or iii) the claim is sent to a commercial insurance company that has a policy that all claims that have "accepted assignment" will be deemed to accept the insurance company's payment as payment in full, will be assigned a value X. If "accept assignment" is not checked, it will be assigned a value of Y. That value will be used to determine the weighted variable for A.

Transforming the Debtor's credit rating into a useful result: Providers, collection companies and other entities use a debtor's credit score to determine if the debtor i) has the means to pay the debt and ii) has a history of paying or defaulting on their debts. Based on this score, creditors will target debtors with high credit scores with aggressive collection efforts because they are more likely to be able to pay and to actually pay the debt. Because of this, the PODS entity knows that a provider will be more aggressive in collecting on accounts where the debtor has a high credit rating score. The PODS entity also knows that it may charge a debtor with a high credit score more than a debtor with a low credit score because a the person with a high credit score is more likely to be motivated to keep a good credit score. The PODS entity also knows that the resistance the provider or collection company will give in settling the debt will increase or decrease based on the Debtor's credit rating. That value will be used to determine the weighted variable for CR.

Transforming if the Debtor is deceased into a useful result: If Debtor is deceased, the value assigned to the variable will be X. If the Debtor is not decease, the value assigned to the variable will be Y. That value will be used to determine the weighted variable for P.

Transforming if the Debtor's is in bankruptcy proceedings into a useful result: If Debtor is in bankruptcy proceedings, the value assigned to the variable will be X. If the Debtor is not in bankruptcy proceedings, the value assigned to the variable will be Y. That value will be used to determine the weighted variable for B and to transform NCB into a result.

When the computer executable code is run, the result returned is GA Estimated Settlement [FIG. 9 #120]. GA will then be stored in computer RAM memory, or on a computer readable storage medium, for use during Post Analysis Reporting per Section VI, below.

While calculating the results for GA, the computer code will also calculate the GA Calculated RES [FIG. 9 #940] by using the following mathematical model embodied in computer code:

GA Calculated RES=((DED*(WV))+(((BAL−DED)*
(WV))*(AG*(WV))*(LAW*(WV))*(COL*
(WV))*(IN*(WV))))

An alternative embodiment for out-of-network providers:

GA Calculated RES=((AG*(WV))*(BAL*(WV))*
(LAW*(WV))*(COL*(WV))*(IN*(WV))*
(DED*(WV)))

After the GA Calculated RES is calculated the GA Cost to Work File [FIG. 9 #952] and the GA Risk Ratio [FIG. 9 #954] will be determined.

GA Cost to Work File=((GA Calculated RES in decimal form)*(average cost to work file))+fixed costs associated with working the file)

GA Risk Ratio=(GA Calculated RES/100).

If the GA Cost to Work File [FIG. 9 #952] is greater than the Selling Price minus GA Estimated Settlement [FIG. 9 #120], then no offer to purchase the debt will be made. Further, if the GA Risk Ratio [FIG. 9 #954] is too high, as determined by the PODS entity, then no offer to purchase the debt will be made.

V. Total Experience Results

Total ERA Collection Experience:

When the temporary Experience Rating Table [FIG. 2 #226] is created for the "Total ERA" data analysis, the variables COL and LAW will both be sets of the Boolean value of "n" ("n" indicates a value of "no" or "false"). Computer code with the mathematical algorithm described herein will then be run over the new, temporary data table [FIG. 2 #238] to determine if there is any indication if either variable COL or LAW contains a "y" in the data table. Each instance of a "y" will be calculated and displayed by the computer software [FIG. 9 #930]. The final result will look like this:

"Total ERA Collection Experience: Law: N-137 COL:N-137"

This indicates to the PODS user that there are 137 records in the data table and never, as indicated by the "N," has the provider caused negative credit rating for the debtor and never has the provider ever commenced any legal action(s). In such a situation, the PODS entity may be aggressive in demanding a settlement with the provider because the PODS entity knows that historically there are no consequences for not settling the outstanding debt. If, the results read like this, "Total ERA Collection Experience: Law:Y-110 COL:Y-110" the PODS entity would know that the provider is very aggressive and adverse consequences would be initiated if the PODS entity did not settle the outstanding debt.

Specific ERA Collection Experience and DMDRA Collection Experience:

The same process as described above would be implemented the only difference being that the temporary data table [FIG. 2 #238] will be used. In the case of the "Specific ERA Collection Experience" [FIG. 9 #932] the data from the "Specific ERA" Experience data table would be used. In the case of the "DMDRA Experience," the data from the "DMDRA ERA" [FIG. 9 #934] Experience data table would be used.

Specific ERA Cost to Work File [FIG. 9 #944] and Specific ERA Risk Ratio [FIG. 9 #946] will be calculated the same way the Total ERA Cost to Work File and the Total ERA Risk Ratio were, the only difference being that the temporary data table [FIG. 2 #238] for "Specific ERA" Experience data table would be used.

VI. Post Analysis Reporting:

Reporting to Debtor:

FIG. 3, FIG. 4, FIG. 5, and FIG. 15 are examples of post analysis reporting and a contractual offer to a Debtor. In these cases, the entity using the PODS system decided on a post analysis reporting variable (i.e. "GA", "SDARA" or "ERA") and applied a profit margin variable to it. This number was then accessed in computer memory and incorporated into the offer made to the Debtor [FIG. 3 #120 or FIG. 4 #120 or FIG. 5 #120]. The Debtor could then either accept the offer or decline it [FIG. 3 #128 or FIG. 4 #128 or FIG. 5 #128] by clicking the "Submit" or "Reset" button.

Reporting to Sales Person, Broker or Intermediary:

FIG. 9 is an example of reporting for sales people, brokers and/or intermediaries. In such an implementation, only the estimated settlement amount [FIG. 9 #120, #922, #924, #926] is reported to the end user. The end user may then add the profit margins, commissions and any other variable to the end result and negotiate a final price with the Debtor.

Once a final price was negotiated between the entity using the PODS system (or an intermediary) and the Debtor, the final price is inputted into the system and an agreement [FIG. 3, FIG. 4, or FIG. 5] is created utilizing the data the sales person, broker or intermediary inputted in FIG. 1A or FIG. 1B. This transformed document would then be sent to the Debtor via email, displayed by computer software, US mail, facsimile or other method for acceptance of the terms and conditions.

Figure 10:
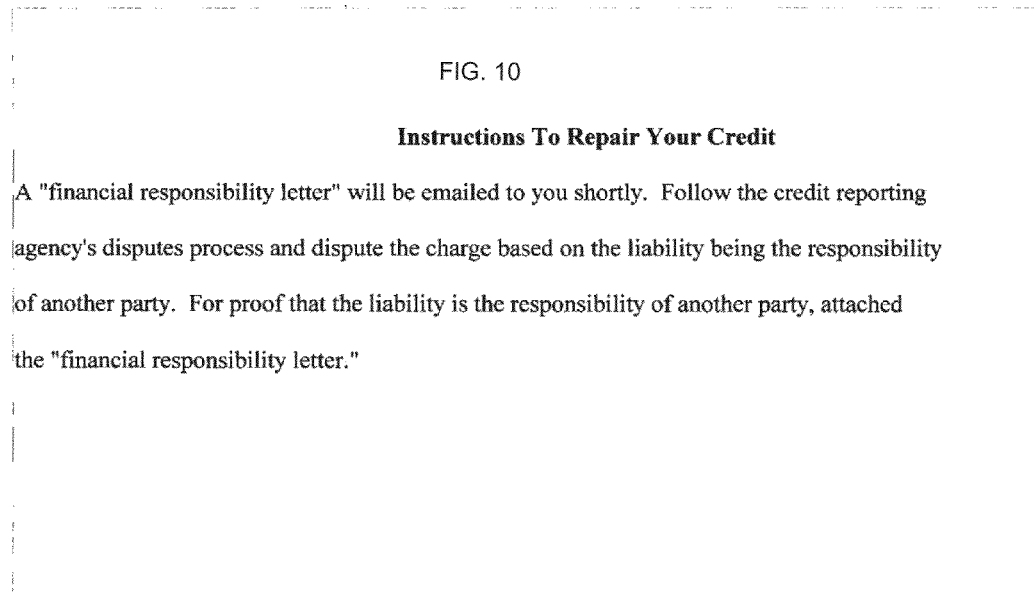
FIG. 10 is a sample computer display indicating that the Debtor must repair his/her own credit and that the financial responsibility letter will be forthcoming.

Once one of the agreements [FIG. 3, FIG. 4, or FIG. 5] has been accepted, electronic documents including instructions for repairing credit [FIG. 10] and a letter accepting assignment of the debt [FIG. 6] would be transformed with the data inputted from [FIG. 1A or FIG. 1B] and sent to the Debtor via email, displayed by computer software, US mail, facsimile or other method. At this same time, the transformed documents [FIG. 10] and [FIG. 6] would also be sent to the provider and/or collection company that is owed the debt stating that the debt is owned by the PODS entity.

Actions Based on the Transformative Variables:

The variables "Price", "RES", "Cost to Work File" and "Risk Ratio" are used to determine if the PODS entity wants to make an offer to Debtor for the outstanding debt. If, after applying mathematical modeling to these variables, the PODS entity determines that the risk of monetary loss due to i) risk on part of the provider, ii) risk based on a loss due to the cost of working the file or iii) insufficient profits, then no offer to purchase the debt will be made.

Similarly, the "Price" variable will be used by the Debtor to determine if Debtor i) wants to sell the debt for the amount offered, ii) can find a better offer elsewhere, or iii) has a tax incentive, or other, that offers a greater incentive than selling the debt at the price offered by the PODS entity.

VII. Working the Debt:

Bonded: It would be beneficial if The PODS entity was bonded for the following reasons. i) The purpose for this is to ensure that the Debtor's money is not stolen by unscrupulous people. ii) Case law has not been established for this invention. In order to show a court that the PODS entity is sincere in having the debt assigned to it, the PODS entity will be bonded proving to the court that all actions are in good faith.

Financial Reserves: Insurance companies must maintain financial reserves to ensure claims payments as outlined by state and federal laws. Because case law and governmental regulations have not been established, the PODS entity should maintain financial reserves in the amount of several months of settlements to ensure provider bills will be settled. This is in an effort to show a court that the PODS entity is credible and acting in good faith.

When to begin working the debt: The PODS entity must begin working the debt after any and all insurance companies have determined that their responsibility has been met. The reasons for this include i) if the debt is lowered to the amount covered by the patient's deductible, then the insurance company does not have to pay any portion of the claim. Because the insurance payment would then not be paid, the provider will likely settle the debt at a higher amount of money thereby causing the PODS entity to lose money. ii) If the settlement occurs after the insurer(s)' payment, then all amounts being settled, or refunded, are considered "patient responsibility" because providers are more concerned with settling the outstanding balances on the accounts than crediting and debiting insurance companies and patients based on settlement amounts.

First Step in Working the Debt:

If the PODS entity desired, it would run a computer program with the mathematical model embodied in computer code [FIG. 2 #230] over the experience rating table [FIG. 2 #226]. Based on the provider UID match, each valid record from the experience data table would be inserted into a new, temporary, experience data table [FIG. 2 #238]. Computer code with a data analysis calculation [FIG. 2 #230] would then be employed seeking to return two variables.

The first variable would be determined by (BAL minus STL) based on M, "M" being the name of the natural person at the provider's office who settled the debt. The computer code would then determine which variable M (a/k/a which natural person at the provider's office) resulted in the best settlement results, as illustrated in FIG. 16. In short, the computer code determines which person ("M") results in the best settlements for the entity using the PODS system. The purpose of this is to identify the person at the provider's office/facility with whom the entity using the PODS system would want to engage in settlement discussions. This result would then be displayed to the entity using the PODS system or could be sent via email or other means.

The second result from the computer code would be the provider's fiscal year end as illustrated in FIG. 16. Often, companies seek to close out their accounting records, open invoices and other financial measures. Based on this, the entity using the PODS system would be provided with the date of the provider's fiscal year end so that the entity could determine what calendar date is best to approach the provider for settlement of the debt. Similarly, the PODS entity may try to settle a large number of debts at this time because the PODS entity is likely to receive a greater reduction when settling the debts.

The downside of this approach is that some providers have developed guidelines on the amount of a discount. FIG. 12 is such an example. To overcome policies like these, the entity using the PODS system must review the provider's billing searching for errors to dispute. Such an example may be finding a male charged for a hysterectomy. Such audits like this overcome a provider's policy on negotiating patient debt because the settlement is based on improper billing and not a straight discount. Straight discounts are subject to Medicare and Medicaid guidelines and contracts with private insurance companies.

Second Step in Working the Debt:

The PODS entity would audit the bill for billing errors, upcoding, over treating, over charging, medical errors and any other intentional or unintentional billing/coding that would increase the amount of the bill. By identifying errors (intentional or unintentional) the provider is not subject to discounting or negotiating guidelines and favored nations clauses imposed by Medicare, Medicaid or private insurance carriers.

The PODS entity would then decide who at the provider's facility they wanted to try and contact and when, in the fiscal year, they wanted to approach that person to obtain the greatest amount of leverage.

If auditing the medical bill did not result in a satisfactory result for the entity using the PODS system, then the PODS entity could, instead, negotiate the medical bill(s) or have the bills repriced. The PODS entity could also challenge the care given stating that the care was i) not given, ii) coded properly iii) standard accepted medical protocol, iv) part of a clinical trial, v) off label use, vi) not medical necessary or any other violation or excess of standard medical protocol.

VIII. Medicare and Discounting

Medicare has guidelines that all providers who participate in the Medicare program must follow. Such guidelines include i) a provider may allow a discount to uninsured patients and ii) a provider must try to obtain all deductibles and co-insurances. Similarly, private insurers have "favored nations" clauses. The invention allows the PODS entity to obtain greater reductions from providers because the debt will be owed by a company and not by a "natural person." The greater reduction in the amount owed come from the fact that a settlement on the amounted owed is not dictated by Medicare guidelines therefore, greater bargaining power exists. Further, because the PODS entity is identifying billing errors, the PODS entity may state that it is not "negotiating the bill" but found "billing errors" that allow the amount to be reduced.

IX. Post Settlement Data

All data collected, along with the post settlement data which includes the variables STL, DS, M (described above) and any other missing variable are entered into the experience rating data table [FIG. 2 #226] that is stored on readable computer storage medium for use with future analysis and/or use.

X. Financial Protections

The steps below may also be used by the PODS entity to obtain additional income by charging for the document or action as promised by the entity using the PODS system.

If FIG. 1A #124, regarding lawsuits, is checked "yes," then instructions, like that found in FIG. 10, and a legal document, like that found in FIG. 6, will be sent via electronic process (i.e. email or computer display) to the Debtor.

If FIG. 1A #126, regarding credit repair, is checked "yes," then instructions on how to remove a bad credit mark like that illustrated in [FIG. 10] will be presented via computer software or sent via email.

XI. Improvement over Negotiating Bills

Advocacy companies have been negotiating provider bills for a flat fee and on a contingency fee basis. The average contingency fee is 30% of the savings. This means that if the advocacy company saved the Debtor $100, the advocacy company's fee would be $30.

The PODS method described herein is an improvement over the negotiating method because it i) builds in financial protections for the Debtor; ii) uses the psychological phenomena of fear of lawsuit or credit that causes a Debtor to want to immediately sell their Debt; iii) uses the psychological phenomena of loss to result in a greater profit (e.g., studies have shown that people fear losing the money they have more than they seek the reward of gaining more money. Based on this, the PODS system works based on psychological factors.); iv) it allows the Debtor to be rid of the debt thereby not having to worry about it or spend resources servicing the debt (i.e. dealing with the creditors, collection agencies, credit bureaus, lawyers and other); and v) it allows the PODS entity a greater profit as illustrated in these examples:

I. Example: Anne owes $150,000 for a treatment that was denied by Humana. Anne is willing to pay $88,500 to settle the medical bill but the hospital will accept $20,000. PODS entity's profits: $68,500. An advocate's fee if the bill had been negotiated (30% contingency fee): $39,000.

II. Example: Mark owes $30,128 for a neurosurgery bill. He is willing to settle for $20,000. The hospital is willing to settle for $8,000. PODS Entity's profits: $12,000. An advocate's fee if the bill had been negotiated (30% contingency fee): $6,638.

III. Example: Paul has a $14,000 dental bill from an accident. He is willing to settle the bill for $10,000 and the dentist is willing to accept $7,000. PODS Entity's profits: $3,000. An advocate's fee if the bill had been negotiated (30% contingency fee): $900.

Another advantage the PODS system has is "double dipping." Specifically, a 2007 Harvard University study stated "Harvard researchers say 62% of all personal bankruptcies in the U.S. in 2007 were caused by health problems—and 78% of those filers had insurance." In such situations it is often the case where the insurance company denied payment on the claim. This invention allows the PODS entity to have the insurance benefit assigned to it, while it also reduces the balance due.

So how does the PODS entity double dip? Advocacy companies work cases on a contingency fee for a percentage of the recovery. If the medical debt is purchased, the revenue margins increase dramatically. First, the advocacy company may seek reimbursement from the insurance company allowing a 2× (two fold) return on the investment when compared to strictly working the claim on a contingency fee basis. Second, at the same time, there is profit made when negotiating the debt with the provider.

EXAMPLE

Mary has a $40,000 bill from a medical procedure that was denied by the insurance company. An advocacy company that fought the insurance company for reimbursement and won would be paid 30% of the savings, equaling $12,000. If the PODS entity purchased the debt liability at a reduced cost for $25,000, then settled the bill with the provider for $20,000, and fought the insurance company for the full $40,000, the PODS entity profit would be $45,000. Additional value to the patient is that once they assigned liability to the PODS entity, they had no more financial exposure, potential bad credit ratings, or other.

While assigning insurance benefits is not new, the difference (or improvement) in some cases is that there are no insurance benefits being assigned. In these instances, the insurance company denied payment so there is no insurance benefit associated with the claim. Instead, the PODS entity is going to have to create value in the denied claim in order to obtain payment from an insurance company.

Another improvement over negotiating bills is the Collection Experience Rating. In a negotiating environment, the advocacy company is forced to work with the provider and reach a settlement otherwise the advocacy company may risk a lawsuit if the Debtor suffers any adverse consequences (i.e. bad credit rating or lawsuit is started). If the debt is assigned, transferred or the PODS entity acts as a guarantor or step-in entity, then the Collection Experience Rating system may be employed.

Example: An advocacy company must reach a settlement with the provider to ensure the Debtor does not suffer any adverse consequences. In this same situation, the PODS entity would look at the Collection Experience Rating and determine that the provider's history indicates that the provider does not affect debtors' credit ratings and the provider does not commence legal actions against debtors. In this example, the PODS entity may offer a very small monetary settlement and if the provider does not accept it, then the PODS entity has a statistical basis to conclude that no adverse action will follow. Further, if there is an adverse action, it would be against the PODS entity and not the Debtor.

XII. Improvement over Collection Companies

Providers often do not use collection companies because the providers want to maintain a positive relationship with the patient. The reason for this is because the provider wants the patient to come back to them the next time the patient, or their family member, becomes ill. Because of that, sending a collection company after a patient to collect on a debt causes problems in that the patient and their friends or family may avoid the provider in the future. The PODS entity will contract with provider(s) to recover on the outstanding debt in a manner that is not adversarial and one that maintains a positive relationship between the provider and patient thereby allowing the patient to feel comfortable to use the provider again in the future.

XIII. Subrogation Calculation

The possibility for subrogation via the health insurance company is determined via calculation and variables. When using this implementation, the final results displayed via software would include the potential for monetary gain by way of the insurance company paying the claim(s) and the final result displayed would be calculated to reflect that.

Mathematical Model for Subrogation Calculation Potential:

If DEN is "true" then DEN variable is set to "0.50" in the formulas below.

If DEN is "false" then DEN variable is set to "1" in the formulas below.

If APL is "true" then APL variable is set to "0" in the formulas below.

If APL is "false" then APL variable is set to "1" in the formulas below.

$$PFS=(100*(DEN*APL))$$

XIV. Third Party Issues

Providers, third party administrators, and other entities are instituting polices and/or declaring that they do not work or interact with third parties. These entities will only work with the patient. These entities do so because it ensures the entity's relationship with the patient. Also, when it comes to reducing a medical bill, the entities know that they will settle the bill for more money from a lay person (a.k.a. the patient) than from a professional. Because of this, they alienate the third party and declare that they will only work with the patient.

Because the PODS entity has accepted assignment, or is acting as the guarantor, or as step-in entity, or has allowed the debt to be transferred to the PODS entity, the issues of only working with third parties has been alleviated.

XV. Estimated Selling Point

When it is not possible to negotiate with the Debtor over the Selling Price and the medical bills are not on an auction site like E-bay, then there are two computerized mathematical models that will be employed to determine the amount for which Debtor is willing to sell the bill. They are the "Calculated Estimate of Seller's Selling Point" (herein "CESSP") and the "Experience Rating of Seller's Selling Point" (herein "ERSSP"). Variables for use in such calculations include:

USID refers to the unique id in the data table for the Debtor
BAL refers to the original outstanding balance of the bill
SOLD refers to the price for which the Debtor sold the medical bill
ZIP refers to the Debtor's zip code
G refers to gender
CR refers to the Debtor's credit rating (i.e. Transunion, Experian, Equifax, FICO score)
WV is a weighted variable determined by the entity using the PODS system
PPM refers to a predetermined profit margin Calculated Estimate of Seller's Selling Point:

Computer software will be used to produce a mathematical model of the CESSP value. The computer software will run a formula in the computer's random access memory using the following variables and mathematical operand. If an experience rating for the provider exists then the computer will run software with the following instruction set:

$$CESSP=(TOTAL\ ERA*CR(WV)*ZIP(WV)*PPM\ (Age\ of\ Bill)$$

If an experience rating for the provider does not exist then the computer will run software with the following instruction set:

$$CESSP=(GA*CR(WV)*ZIP(WV)*PPM)$$

Experience Rating of Seller's Selling Point:

A data table stored on computer readable medium [FIG. 2 #242] will be stored for every Debtor that uses the system. When a Debtor agrees to sell the debt to the PODS entity, the ERSSP data table will be updated with the terms of the sale so that an experience rating may be determined in the future. Further, the Debtor's zip code and gender are also stored so that predictive modeling may be used in the future based on these variables.

TABLE #4

| USID - Debtor | BAL | SOLD | G | ZIP |
|---|---|---|---|---|
| 1-Mark Harris | $323 | $180 | male | 08051 |
| 2-Mark Harris | $12,121 | $6,232 | male | 08051 |
| 3-Mark Harris | $4,643 | $2,411 | male | 08051 |
| 4-Robert Black | $6,233 | $4,543 | male | 08051 |
| 5-Robert Black | $3,234 | $2,732 | male | 08051 |

If an experience rating for the provider does not exist then the computer will run software with the following instruction set:

Sample Computer Code:
If ((BAL−AVG-SOLD)<(GA*PPM)) then (ERSSP=(GA*PPM))
    Else
ERSSP=(BAL−AVG-SOLD)

If an experience rating for the provider does exist then the computer will run software with the following instruction set. Every record in the ERSSP where the USID is for the Debtor currently selling the bill will be copied into a temporary data table. Then each record a computer software will be run over the data with the following instruction set ((SOLD/BAL)*100); each result will then be stored in Random Access Memory. Once the percentage for which the bill was sold is calculated for each record, all results will be averaged and stored in random access memory in the variable AVG-SOLD.

Sample Computer Code:
If ((BAL−AVG-SOLD)<(TOTAL ERA*PPM)) then (ERSSP=(TOTAL ERA*PPM))
    Else
ERSSP=(BAL−AVG-SOLD)

XVI. How the PODS System would be Implemented by a Debtor/Seller

Figure 13C:
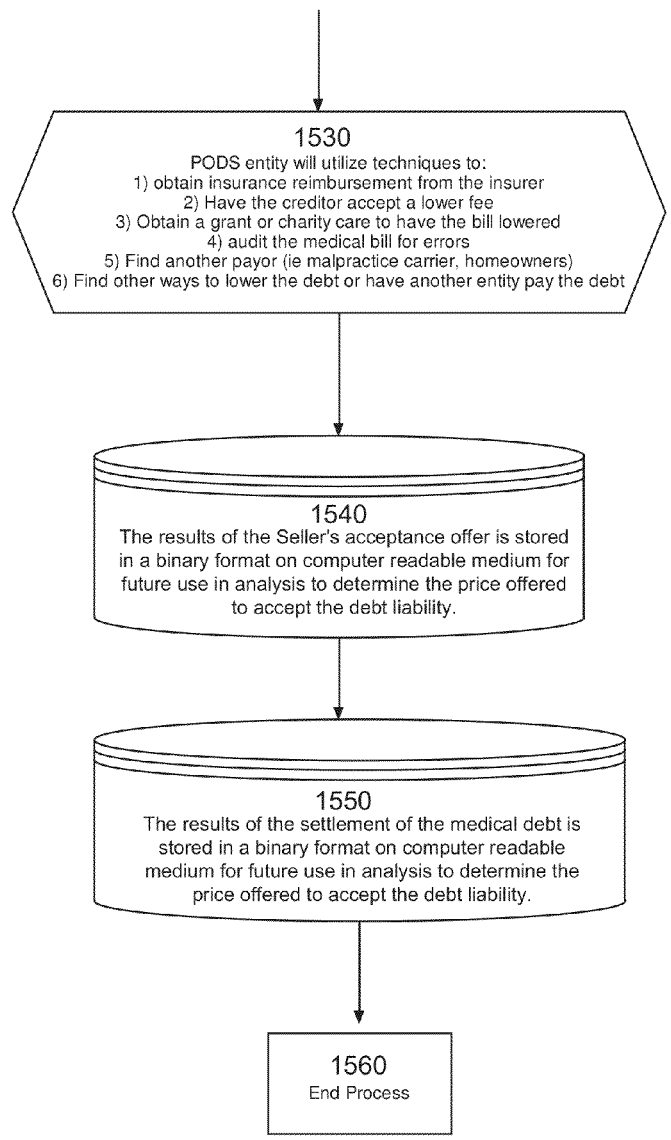

In an exemplary embodiment as illustrated in FIGS. 13A-13C, the invention includes computer implemented methods, mathematical models and algorithms, computer systems, and computer readable storage media including instructions that when processed by a processor enable the processor to implement methods for an entity using the PODS system to realize a financial gain by purchasing debt at specific price and then obtaining insurance reimbursement or obtaining a lower settlement amount with the creditor. In exemplary embodiments, such method includes the steps of:

the Seller accessing the software via the Internet or PODs network [FIG. 13A #1310];

the Seller enters information into software via an application programming interface [FIG. 13A #1320];

the Seller uploads a scanned image of the medical bill and insurance statement (EOB) to the PODS computer system [FIG. 13A #1330];

the PODS computer system stores the entered information in a physical binary structure that is stored on a computer readable storage medium as a PODS database [FIG. 13A #1340];

the PODS computer system then scans the medical bill and EOB and populates the PODS database with this data [FIG. 13A #1340]; and the PODS computer system executes queries that contain mathematical models and algorithms over the data stored in the PODS database and results are produced [FIG. 13A #1350].

In the exemplary embodiment, execution of the mathematical models and algorithms includes executing computer code that processes historical data of past settlements in order to predict the provider's settlement price. This query returns a few different results (each based on a different mathematical model) so that the PODS computer system may evaluate the predicted settlement price in different ways. Execution of the mathematical models and algorithms also includes executing computer code that processes the data inputted by the Seller to predict the provider's settlement price. This method is strictly a mathematical model and does not use historic data. Based on the processing of the computer algorithms, a mathematical model and result is determined. The mathematical result is compared to pre-determined criteria to determine if the PODS computer system desires to purchase the debt liability based on pre-established criteria.

At #1360 [FIG. 13A], the PODS computer system returns a result to the Seller stating whether or not the user of the PODS computer system wants to purchase the debt or not. If the user of the PODS computer system does not want to make an offer to purchase the debt, it will state this on the computer display screen [FIG. 13A #1370] and the process ends [FIG. 13A #1380]. However, if the user of the PODS computer system does want to make an offer to accept/purchase the debt [FIG. 13A #1390], an appropriate indication will be displayed on the computer display screen [FIG. 13A #1400]. The Seller may then choose to accept or decline the offer [FIG.

13B #1410]. If the Seller declines the offer [FIG. 13B #1420], then that is the end of the process [FIG. 13B #1430]. If the Seller chooses to accept the offer [FIG. 13B #1440], then the PODS computer system will query the physical PODS database for the legal language and then make a transformative document inputting the Seller's information, the medical bill information, and the purchase price that was determined by the mathematical models [FIG. 13B #1450]. The transformative document [e.g., FIG. 3, 4, or 5] will be displayed via a computer display [FIG. 13B #1460], and the Seller must decide whether he/she wants to decline or accept the offer to purchase the debt made by the PODS computer system. If the Seller declines the offer (transformative documents containing legal language) [FIG. 13B #1470], then that is the end of the process [FIG. 13B #1480]. If the Seller does accept the offer made by the PODS computer system [FIG. 13B #1490], then the PODS computer system will display payment information [FIG. 13B #1500]. This will be a software display where the Seller may enter his/her credit card or electronic checking information.

After payment is made by the Seller, the PODS computer system will create a transformative letter (e.g., as illustrated in FIG. 6, FIG. 7, or FIG. 8) that will be sent electronically to the creditor stating that the user of the PODS computer system has assumed the liability for the debt [FIG. 13B #1510]. If the Seller's credit rating was affected by the outstanding medical bill, then the PODS computer system will generate a transformative letter by inputting specific data from the Seller's contact information and pre-determined contract language and email this letter to the Seller, or to the credit bureau (i.e. TransUnion, Equifax, Experian) [FIG. 13B #1520]. The user of the PODS computer system will utilize his/her skill to i) seek reimbursement from a payer, negotiate with the creditor to accept a lower offer, obtain a grant or charity care to help lower or pay the medical bill, audit the medical bill for errors, identify another payer (i.e. malpractice carrier, homeowners), and/or find other ways to lower the debt [FIG. 13C #1530]. The results of the Seller's payment price and demographic details are entered into the PODS database [FIG. 13C #1540]. The results of the settlement of the medical debt are entered into the PODS database [FIG. 13C #1550] and process is then complete [FIG. 13C #1560].

XVII. How the PODS System would be Implemented by a Payer

Figure 14A:
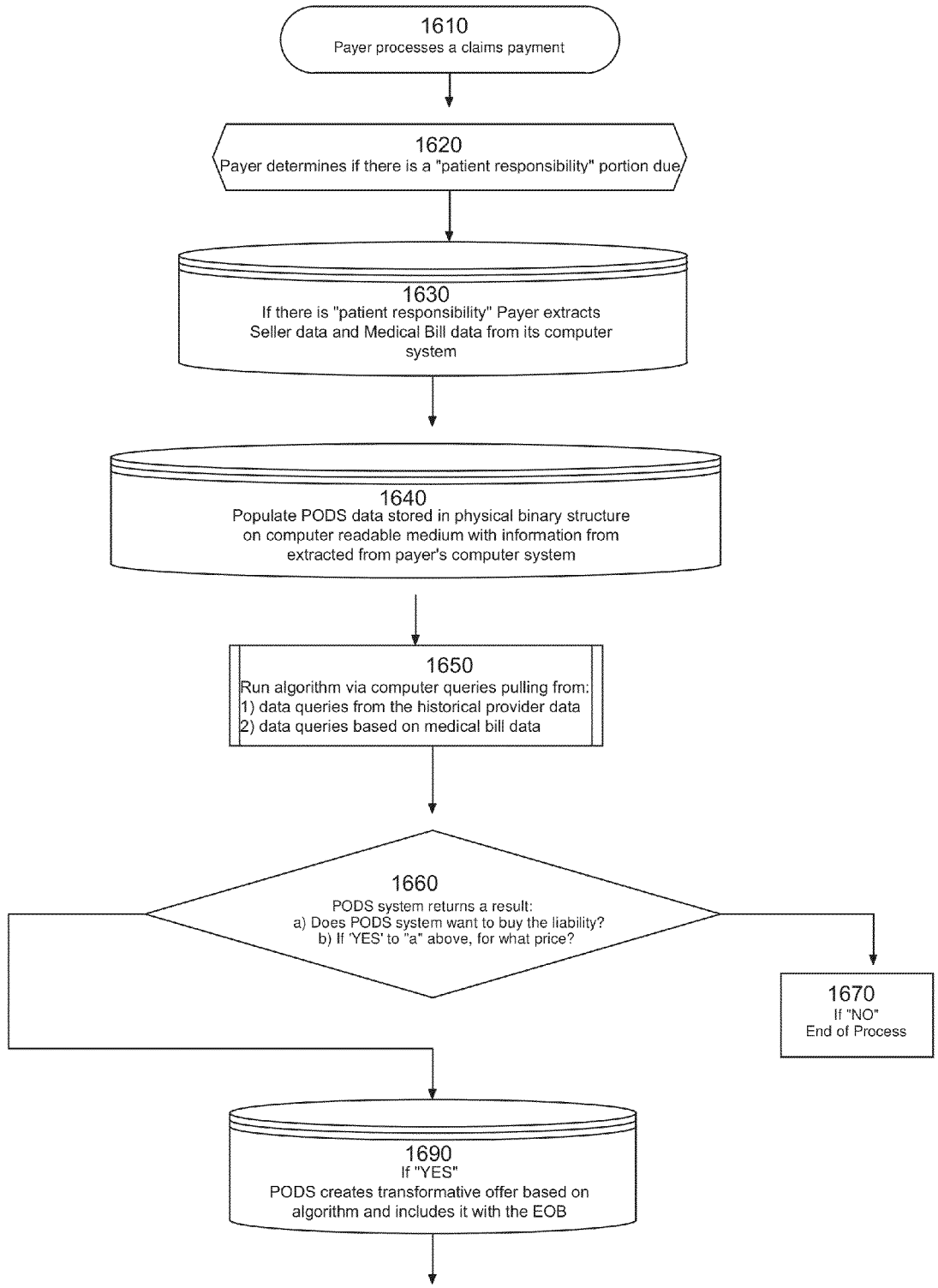

In an exemplary embodiment illustrated in FIGS. 14A-14C, a payer would utilize the PODS system in the following manner as this embodiment provides efficiencies, speed, increased knowledge as the Payer already has the required information stored in its computer system:

Step #1: [FIG. 14A #1610] A payer will scan its claim forms and use software that extracts claims data to populate a database for processing its claims in its usual manner.

Step #2: [FIG. 14A #1620] The payer will run a mathematical formula over the claims data to determine if there is a "patient responsibility" portion due.

Step #3: [FIG. 14A #1630] If there is "patient responsibility" due, the payer's computer system will run a computer query over the data to extract the Seller's contact information, all claims details and whether or not the provider is in-network or out-of-network.

Step #4: [FIG. 14A #1640] The PODS computerized system enters the information extracted from the payer's data into the PODS computerized system. This information is stored in a physical binary structure that is stored on computer readable medium.

Step #5: [FIG. 14A #1650] The PODS system executes computer queries that contain mathematical models and algorithms over its historic data and results are produced. Computer code is executed including over the physical binary data structure that contains historical data of past settlements in order to predict the provider's settlement price. Of note is that this query returns a few different results (each based on a different mathematical model) so the PODS entity may evaluate the predicted settlement price different ways. Computer code including an algorithm also is run over the data that is inputted by the Seller to predict the provider's settlement price. This method is strictly a mathematical model and does not use historic data. Based on the computer algorithms, a mathematical model and result is determined. The mathematical result is compared to pre-determined criteria to determine if the PODS entity wants to purchase the debt liability.

Step #6: [FIG. 14A #1660] The PODS system will decide whether or not the PODS entity wants to purchase the debt. If the PODS entity does not want to make an offer to purchase the debt, that is the end of the process [FIG. 14A #1670].

Step #7: [FIG. 14A #1690] If the PODS entity does want to make an offer to purchase the debt, it will create a transformative document based on the information extracted from the claim data and the results of the mathematical formula and incorporate that into a new document that may be sent to the Seller with the payer's electronic claims system or incorporated with the payer's EOB that is sent via US Mail. An example of such a document may be found in FIG. 11.

Step #8: The Seller may then choose to accept or decline the offer [FIG. 14B #1710]. If the Seller declines the offer [FIG. 14B #1720] then that is the end of the process. If the Seller chooses to accept the offer [FIG. 14B #1740], then the seller will access the payer's computer system via the Internet, unless the Seller was accessing the payer's electronic claims system in which case the Seller would already be in the payer's electronic claims system.

Step #9: The PODS entity will query the physical binary data structure for the legal language and then make a transformative document inputting the Seller's information, the medical bill information, and the purchase price that was determined by the mathematical models [FIG. 14B #1750]. Examples of the transformative document may be found in FIG. 3, FIG. 4 or FIG. 5.

Step #10: [FIG. 14B #1760] The transformative document will be displayed via a computer display to the Seller and the Seller must decide whether he/she wants to decline or accept the offer to purchase the debt made by the PODS entity. If the Seller declines the offer (transformative documents containing legal language) [FIG. 14B #1770] then that is the end of the process [FIG. 14B #1780]. If the Seller does accept the offer made by the PODS entity [FIG. 14B #1790], then the PODS computer system will display payment information [FIG. 14B #1800]. The software will then display the electronic payment mechanism where the Seller may enter his/her credit card or electronic checking information.

Step #11: After payment is made by the Seller, the PODS computer system will create a transformative letter [FIG. 14B #1810] that will be sent electronically to the creditor stating that the PODS entity has assumed the liability for the debt. An example of such a letter may be found in FIG. 6, FIG. 7 or FIG. 8.

Figure 14C:
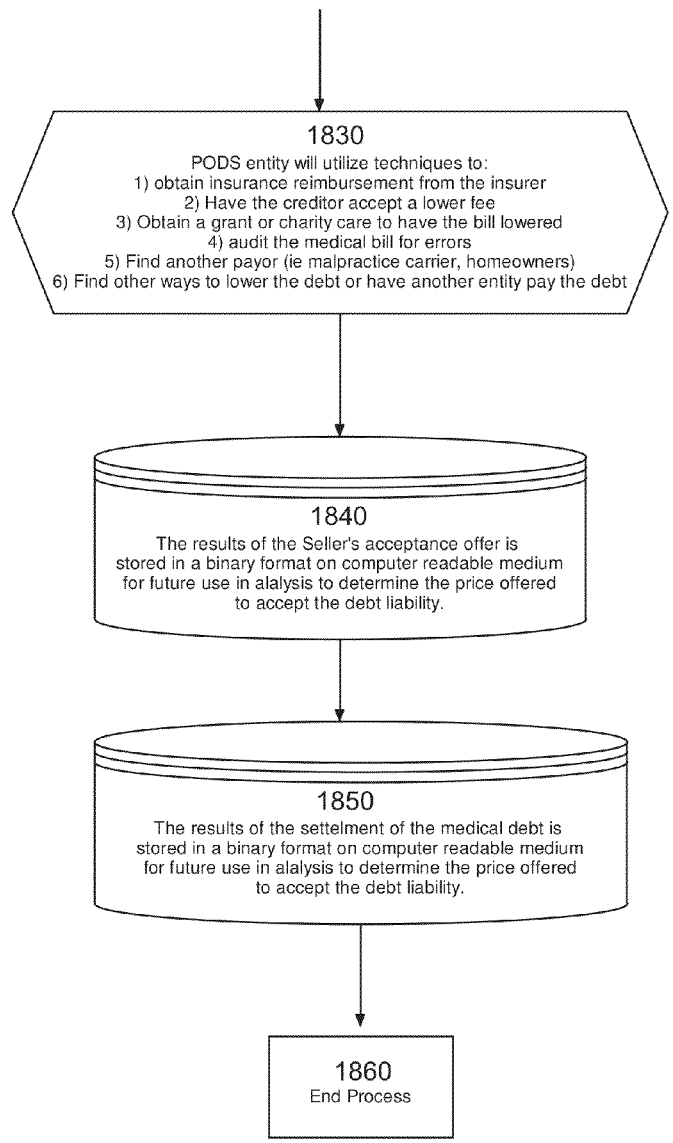

Step #12: [FIG. 14C #1830] Next, the PODS entity will utilize its skill to seek reimbursement form a payer, negotiate with the creditor to accept a lower offer, obtain a grant or charity care to help lower or pay the medical bill, audit the medical bill for errors, identify another payer (i.e. malpractice carrier, homeowners), and/or find other ways to lower the debt.

Step #13: [FIG. 14C #1840] The results of the Seller's payment price and demographic details are entered into the PODS historical database that is stored in a physical binary data structure on the computer readable medium.

Step #14: [FIG. 14C #1850] the results of the settlement of the medical debt are entered into the PODS historical database that is stored in a physical binary data structure on computer readable medium. The process is then complete [FIG. 14C #1860].

XVII. Alternative Methods

Some of the processes in this application may be altered. For example, FIG. 1A is used in situations where the insurance company(s) has already exhausted the insurance benefit, while FIG. 1B is used when a debtor wants to sell the debt prior to the insurance benefit being exhausted. The invention addresses assigning the debt, acting as a guarantor, and acting as a step-in agent; however, other options include novation and are intended to be within the scope of the invention.

As another example, U.S. Pat. No. 5,446,653 describes a method of financial protection based on the data inputted in FIG. 1A. (Note: the following implementations refer to FIG. 3, FIG. 4 and FIG. 5 depending on the implementation the PODS entity chose to use.)

1) If [FIG. 1A #124], regarding lawsuits, is checked "yes" then the following text will be inserted at Section 6(B)(ii) in [FIG. 3 #130]. If it is checked "no" then the text will not be inserted in [FIG. 3 #130].

The Text:

"(ii) If legal action by the provider is initiated for nonpayment of the bill(s) accepted by HCA (in Section 1) against Seller, HCA agrees to indemnity, defend and hold harmless ("assume the defense") Seller in the legal action. This clause is void if the legal action involves fraud, misrepresentation(s), a retracted payment by a payer, a breach of an agreement between the plaintiff and Seller, or other action that is not for the exclusive reason of payment of the medical bill."

2) If FIG. 1A #126, regarding credit repair, is checked "yes", then FIG. 10 will be sent to the Debtor via an electronic means (i.e. email, facsimile). If it is checked "no" then FIG. 10 will not be sent to the Debtor.

XVIII. Example Computing Environment

Figure 17:
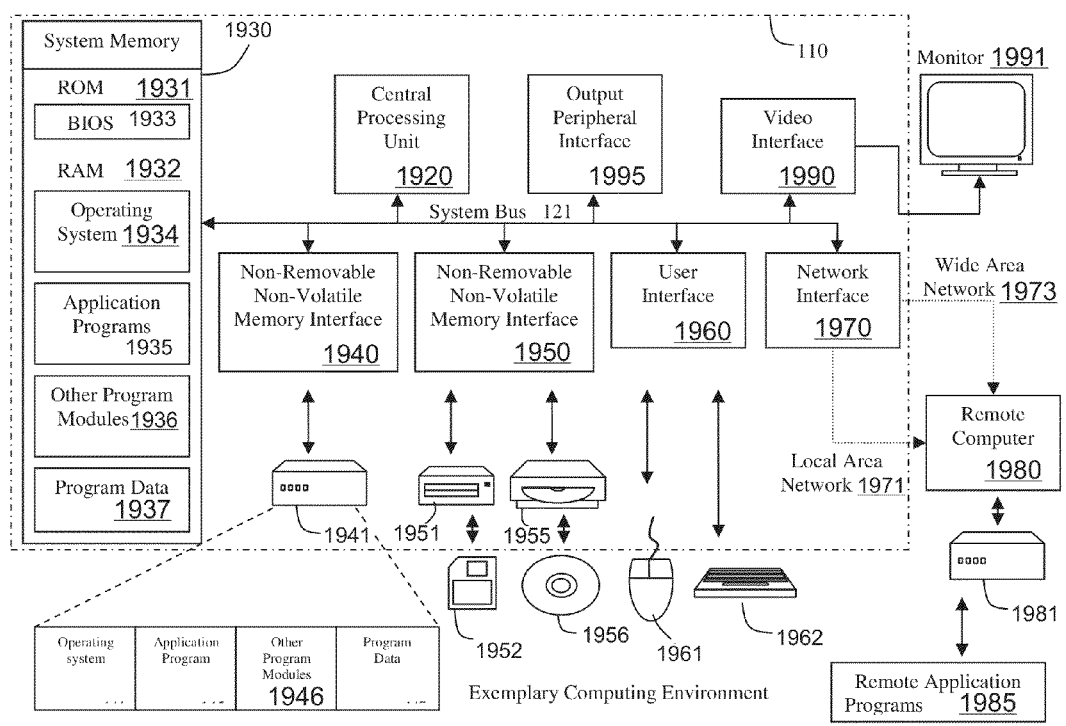
FIG. 17 is a sample of a specific device/computing environment used in the system of FIG. 2.

FIG. 17 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well-known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 17 thus illustrates an example of a suitable computing system environment 1900 in which the invention may be implemented, although as made clear above, the computing system environment 1900 is only one example of a suitable computing environment and is not intended to suggest any limitation as to the scope of use or functionality of the invention. Neither should the computing environment 1900 be interpreted as having any dependency or requirement relating to any one or a combination of components illustrated in the exemplary operating environment 1900.

With reference to FIG. 17, an example system for implementing the invention includes a general purpose computing device in the form of a computer 1910. Components of the computer 1910 may include, but are not limited to, a processing unit 1920, a system memory 1930, and a system bus 1921 that couples various system components including the system memory to the processing unit 1920. The system bus 1921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI-Express bus.

The computer 1910 typically includes a variety of computer readable storage media. Computer readable storage media can be any available media that can be accessed by the computer 1910 and includes volatile and nonvolatile, removable and non-removable media. By way of example, and not limitation, computer readable storage media includes volatile and nonvolatile, removable and non-removable storage media implemented in any method or technology for storage of information such as computer readable instructions, data structures, program modules or other data. Computer readable storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by the computer 1910. Combinations of any of the above should also be included within the scope of computer readable storage media.

The system memory 1930 includes computer storage media in the form of volatile and/or nonvolatile memory such as ROM 1931 and RAM 1932. A basic input/output system 1933 (BIOS), containing the basic routines that help to transfer information between elements within computer 1910, such as during start-up, is typically stored in ROM 1931. RAM 1932 typically contains data and/or program modules that are immediately accessible to and/or presently being operated on by the processing unit 1920. By way of example, and not limitation, FIG. 17 illustrates operating system 1934, application programs 1935, other program modules 1936, and program data 1937. RAM 1932 may contain other data and/or program modules.

The computer 110 may also include other removable/non-removable, volatile/nonvolatile computer readable storage media. By way of example only, FIG. 17 illustrates a hard disk drive 1941 that reads from or writes to non-removable, non-volatile magnetic media, a magnetic disk drive 1951 that reads from or writes to a removable, nonvolatile magnetic disk 1952, and an optical disk drive 1955 that reads from or writes to a removable, nonvolatile optical disk 1956, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1941 is typically connected to the system bus 1921 through a non-removable memory interface such as interface 1940, and magnetic disk drive 1951 and optical disk drive 1955 are typically connected to the system bus 1921 by a removable memory interface, such as interface 1950.

The drives and their associated computer readable storage media discussed above and illustrated in FIG. 17 provide storage of computer readable instructions, data structures, program modules and other data for the computer 1910. In FIG. 17, for example, the hard disk drive 1941 is illustrated as storing operating system 1944, application programs 1945, other program modules 1946, and program data 1947. Note that these components can either be the same as or different from operating system 1934, application programs 1935, other program modules 1936, and program data 1937. Operating system 1944, application programs 1945, other program modules 1946, and program data 1947 are given different numbers here to illustrate that, at a minimum, they are different copies. A user may enter commands and information into the computer 1910 through input devices such as a keyboard 1962 and pointing device 1961, commonly referred to as a mouse, trackball or touch pad. Other input devices (not shown) may include a microphone, joystick, game pad, satellite dish, scanner, or the like. These and other input devices are often connected to the processing unit 1920 through a user input interface 1960 that is coupled to the system bus 1921, but may be connected by other interface and bus structures, such as a parallel port, game port or a universal serial bus (USB).

A monitor 1991 or other type of display device is also connected to the system bus 1921 via an interface, such as a video interface 1990. In addition to monitor 1991, computers may also include other peripheral output devices such as speakers and a printer (not shown), which may be connected through an output peripheral interface 1995.

The computer 1910 may operate in a networked environment using logical connections to one or more remote computers, such as a remote computer 1980. The remote computer 1980 may be a personal computer, a server, a router, a network PC, a peer device or other common network node, and typically includes many or all of the elements described above relative to the computer 1910, although only a memory storage device 1981 has been illustrated in FIG. 17. The logical connections depicted in FIG. 17 include a local area network (LAN) 1971 and a wide area network (WAN) 1973, but may also include other networks. Such networking environments are commonplace in offices, enterprise-wide computer networks, intranets and the Internet.

When used in a LAN networking environment, the computer 1910 is connected to the LAN 171 through a network interface or adapter 1970. When used in a WAN networking environment, the computer 1910 typically includes means for establishing communications over the WAN 1973, such as the Internet. In a networked environment, program modules depicted relative to the computer 1910, or portions thereof, may be stored in the remote memory storage device. By way of example, and not limitation, FIG. 17 illustrates remote application programs 1985 as residing on a memory device 181. Remote application programs 1985 include, but are not limited to web server applications such as Microsoft® Internet Information Services (IIS)® and Apache HTTP Server which provides content which resides on the remote storage device 1981 or other accessible storage device to the World Wide Web. It will be appreciated that the network connections shown are exemplary and other means of establishing a communications link between the computers may be used.

One of ordinary skill in the art can appreciate that a computer 1910 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Network Environment

Figure 18:
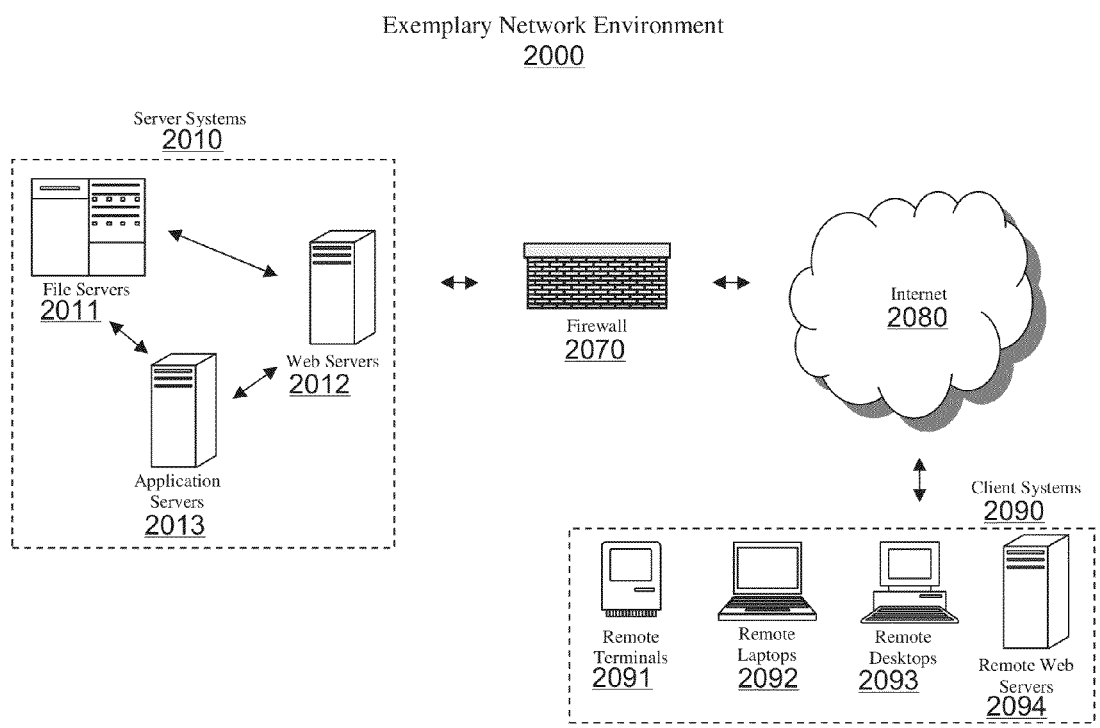
FIG. 18 is a sample computing network environment used in the system of FIG. 2.

FIG. 18 illustrates an embodiment of a network environment in which an embodiment of the present invention can be implemented. The network environment 2000 contains a number of server systems 2010, which may include a number of file servers 2011, web servers 212, and application servers 2013. These servers are in communication with a wider area network such as the Internet 2080 though typically some network security measures such as a firewall 2070. A number of client systems 2090 that are in communication with the server systems 2010. The client computer systems can be a variety of remote terminals 2091, remote laptops 2092, remote desktops 2093, and remote web servers 2094. Service requests are sent by client systems 2090 to the server systems 2010 via the network 2080. The server systems 2010 process the service requests, and return the results to the client systems via the network 2080.

FIG. 18 illustrates an exemplary network environment. Those of ordinary skill in the art will appreciate that the teachings of the present invention can be used with any number of network environments and network configurations.

These and other advantages of the present invention will be apparent to those skilled in the art from the foregoing specification. For example, the system and process of the invention provide a way to repair a negative credit remark on a person's credit history by way of assigning the debt to another entity/person then submitting proof of liability for the debt. In an another embodiment, the PODS system may estimate the lowest amount to bid to purchase medical debt in an inverse auction, or a buy it now auction like that run by E-bay.com. Accordingly, it will be recognized by those skilled in the art that changes or modifications may be made to the above-described embodiments without departing from the broad inventive concepts of the invention. It should therefore be understood that this invention is not limited to the particular embodiments described herein, but is rather intended to include all changes and modifications that are within the scope and spirit of the invention.

What is claimed is:

1. A computer implemented method of eliminating a Debtor's debt obligation to a creditor, comprising the steps of:
a processor receiving data from the Debtor relating to the Debtor's debt obligation;
the processor processing the data received from the Debtor to determine a debt purchase amount less than a total debt obligation that the Debtor owes to the creditor, wherein an assignee of the Debtor's debt obligation would be willing to pay the debt purchase amount to fully assume the Debtor's debt obligation;
the processor processing the data received from the Debtor using a rating algorithm that determines, based on the Debtor's debt obligation and characteristics of the creditor, an anticipated amount for which the creditor will settle the debt;
the processor providing an offer from the assignee to the Debtor to buy the Debtor's debt obligation at the debt purchase amount, accepting an offer from the Debtor to sell the Debtor's debt obligation to the assignee at the debt purchase amount or another amount offered by the Debtor, and requesting that the creditor authorize transfer of the Debtor's debt obligation from the Debtor to the assignee for the debt purchase amount; and
upon acceptance of the offer to buy or sell the Debtor's debt obligation or upon authorization by the creditor to transfer the Debtor's debt obligation from the Debtor to the assignee, the assignee receiving assignment of the Debtor's debt obligation, becoming a guarantor of the Debtor's debt obligation, or becoming a step-in entity in place of the Debtor with regard to the creditor.

2. The method of claim 1, further comprising the assignee negotiating a settlement of the assigned Debtor's debt obligation with the creditor.

3. The method of claim 2, wherein the Debtor's debt obligation is not secured by a tangible asset.

4. The method of claim 3, wherein the Debtor's debt obligation is a debt obligation to a creditor that is a provider of medical care.

5. The method of claim 4, further comprising the assignee negotiating a settlement with the Debtor's medical insurance company for any claim of insurance coverage for the medical care.

6. The method of claim 1, further comprising the assignee submitting proof of liability for the Debtor's debt obligation by the assignee to the Debtor's credit rating service to remove negative credit marks.

7. The method of claim 1, wherein the rating algorithm includes a mathematical model that is embodied in computer code on the processor to determine how difficult it will be to obtain an acceptable settlement with the creditor and an anticipated difference between the Debtor's debt obligation and the amount for which the creditor will settle the Debtor's debt obligation.

8. The method of claim 7, wherein the rating algorithm estimates the cost of negotiating the Debtor's debt obligation with the creditor from a time the Debtor's debt obligation is assigned to the assignee to a time of settlement of the Debtor's debt obligation with the creditor.

9. The method of claim 7, wherein the rating algorithm estimates a risk ratio of receiving an assignment of the Debtor's debt obligation at the debt purchase amount.

10. The method of claim 1, wherein providing an offer to the Debtor comprises estimating a lowest amount to bid to purchase the Debtor's debt obligation in an inverse auction or buy it now auction.

11. The method of claim 2, wherein the data processing step comprises identifying a best time in a fiscal year of the creditor to approach the creditor for a discount on the assigned Debtor's debt obligation or identifying a best natural person at a creditor's facility to approach to obtain a discounted financial settlement of the assigned Debtor's debt obligation.

12. The method of claim 1, further comprising the processor maintaining a record of collection activities of creditors including said creditor and including such activities in the calculation of the debt purchase amount.

13. A computer system for eliminating a Debtor's debt obligation to a creditor, comprising:
a processor; and
a memory that stores instructions executable by said processor that, when executed, cause said processor to implement a method comprising the steps of:
receiving data from the Debtor relating to the Debtor's debt obligation;
processing the data received from the Debtor to determine a debt purchase amount less than a total debt obligation that the Debtor owes to the creditor, wherein an assignee of the Debtor's debt obligation would be willing to pay the debt purchase amount to fully assume the Debtor's debt obligation;
processing the data received from the Debtor using a rating algorithm to determine, based on the Debtor's debt obligation and characteristics of the creditor, an anticipated amount for which the creditor will settle the debt;
providing an offer from the assignee to the Debtor to buy the Debtor's debt obligation at the debt purchase amount, accepting an offer from the Debtor to sell the Debtor's debt obligation to the assignee at the debt purchase amount or another amount offered by the Debtor, and requesting that the creditor authorize transfer of the Debtor's debt obligation from the Debtor to the assignee for the debt purchase amount; and
upon acceptance of the offer to buy or sell the Debtor's debt obligation or upon authorization by the creditor to transfer the Debtor's debt obligation from the Debtor to the assignee, enabling the assignee to receive assignment of the Debtor's debt obligation, to become a guarantor of the Debtor's debt obligation, or to become a step-in entity in place of the Debtor with regard to the creditor.

14. The system of claim 13, wherein the processor provides data to the assignee that the assignee may use to negotiate a settlement of the assigned Debtor's debt obligation with the creditor.

15. The system of claim 14, wherein the Debtor's debt obligation is not secured by a tangible asset.

16. The system of claim 15, wherein the Debtor's debt obligation is a debt obligation to a creditor that is a provider of medical care.

17. The system of claim 16, wherein the processor provides data to the assignee that the assignee may use to negotiate a settlement with the Debtor's medical insurance company for any claim of insurance coverage for the medical care.

18. The system of claim 13, wherein the rating algorithm includes a mathematical model for calculating a Debtor's selling price, determining how difficult it will be to obtain an acceptable settlement with the creditor, or determining an anticipated difference between the Debtor's debt obligation and the amount for which the creditor will settle the Debtor's debt obligation.

19. The system of claim 18, wherein the rating algorithm estimates the cost of negotiating the Debtor's debt obligation with the creditor from a time the Debtor's debt obligation is assigned to the assignee to a time of settlement of the Debtor's debt obligation with the creditor.

20. The system of claim 18, wherein the rating algorithm estimates a risk ratio of receiving an assignment of the Debtor's debt obligation at the debt purchase amount.

21. The system of claim 13, wherein the processor provides an offer to the Debtor by executing instructions for estimating a lowest amount to bid to purchase the Debtor's debt obligation in an inverse auction or buy it now auction.

22. The system of claim 14, wherein the data provided to the assignee by the processor includes data for identifying a best time in a fiscal year of the creditor to approach the creditor for a discount on the assigned Debtor's debt obligation or data for identifying a best natural person at a creditor's facility to approach to obtain a discounted financial settlement of the assigned Debtor's debt obligation.

23. The system of claim 13, wherein the processor further executes instructions for maintaining a record of collection activities of creditors including said creditor and includes such activities in the calculation of the debt purchase amount.

24. A non-transitory computer readable storage medium having stored thereon instructions that when executed by a processor cause said processor to implement a method of eliminating a Debtor's debt obligation to a creditor, said instructions comprising instructions for performing the steps of:
  receiving data from the Debtor relating to the Debtor's debt obligation;
  processing the data received from the Debtor to determine a debt purchase amount less than a total debt obligation that the Debtor owes to the creditor, wherein an assignee of the Debtor's debt obligation would be willing to pay the debt purchase amount to fully assume the Debtor's debt obligation;
  processing the data received from the Debtor using a rating algorithm to determine, based on the Debtor's debt obligation and characteristics of the creditor, an anticipated amount for which the creditor will settle the debt;
  providing an offer from the assignee to the Debtor to buy the Debtor's debt obligation at the debt purchase amount, accepting an offer from the Debtor to sell the Debtor's debt obligation to the assignee at the debt purchase amount or another amount offered by the Debtor, and requesting that the creditor authorize transfer of the Debtor's debt obligation from the Debtor to the assignee for the debt purchase amount; and
  upon acceptance of the offer to buy or sell the Debtor's debt obligation or upon authorization by the creditor to transfer the Debtor's debt obligation from the Debtor to the assignee, enabling the assignee to receive assignment of the Debtor's debt obligation, to become a guarantor of the Debtor's debt obligation, or to become a step-in entity in place of the Debtor with regard to the creditor.

25. The non-transitory storage medium of claim 24, further comprising instructions for providing data to an assignee that the assignee may use to negotiate a settlement of the assigned Debtor's debt obligation with the creditor.

26. The non-transitory storage medium of claim 25, wherein the Debtor's debt obligation is not secured by a tangible asset.

27. The non-transitory storage medium of claim 26, wherein the Debtor's debt obligation is a debt obligation to a creditor that is a provider of medical care.

28. The non-transitory storage medium of claim 27, further comprising instructions for providing data to the assignee that the assignee may use to negotiate a settlement with the Debtor's medical insurance company for any claim of insurance coverage for the medical care.

29. The non-transitory storage medium of claim 24, wherein said instructions further comprise instructions for implementing a mathematical model for calculating a Debtor's selling price, determining how difficult it will be to obtain an acceptable settlement with the creditor, or determining an anticipated difference between the Debtor's debt obligation and the amount for which the creditor will settle the Debtor's debt obligation.

30. The non-transitory storage medium of claim 29, wherein said instructions further comprise instructions for estimating the cost of negotiating the Debtor's debt obligation with the creditor from a time the Debtor's debt obligation is assigned to the assignee to a time of settlement of the Debtor's debt obligation with the creditor.

31. The non-transitory storage medium of claim 29, wherein said instructions further comprise instructions for estimating a risk ratio of receiving an assignment of the Debtor's debt obligation at the debt purchase amount.

32. The non-transitory storage medium of claim 24, further comprising instructions for providing an offer to the Debtor by estimating a lowest amount to bid to purchase the Debtor's debt obligation in an inverse auction or buy it now auction.

33. The non-transitory storage medium of claim 25, wherein the data provided to the assignee includes data for identifying a best time in a fiscal year of the creditor to approach the creditor for a discount on the assigned Debtor's debt obligation or data for identifying a best natural person at a creditor's facility to approach to obtain a discounted financial settlement of the assigned Debtor's debt obligation.

34. The non-transitory storage medium of claim 24, further comprising instructions for maintaining a record of collection activities of creditors including said creditor and including such activities in the calculation of the debt purchase amount.

* * * * *